United States Patent
Sasaki et al.

(10) Patent No.: US 6,671,135 B2
(45) Date of Patent: Dec. 30, 2003

(54) THIN FILM MAGNETIC HEAD RECESSED PARTIALLY INTO SUBSTRATE AND INCLUDING PLANARIZATION LAYERS

(75) Inventors: Yoshitaka Sasaki, Yokohama (JP); Atsushi Iijima, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/419,087

(22) Filed: Apr. 21, 2003

(65) Prior Publication Data

US 2003/0193743 A1 Oct. 16, 2003

Related U.S. Application Data

(63) Continuation of application No. 09/124,992, filed on Jul. 30, 1998, now abandoned.

(30) Foreign Application Priority Data

Dec. 12, 1997 (JP) ............................................. 9-342917
Feb. 17, 1998 (JP) ............................................. 10-34824

(51) Int. Cl.⁷ .............................. G11B 5/39; G11B 5/31; G11B 5/265
(52) U.S. Cl. ........................ 360/317; 360/126; 360/121
(58) Field of Search .................. 360/317, 121, 360/126

(56) References Cited

U.S. PATENT DOCUMENTS

| | | | | |
|---|---|---|---|---|
| 4,853,815 A | * | 8/1989 | Diepers | 360/126 |
| 4,896,147 A | * | 1/1990 | Futakata | 345/472 |
| 5,245,493 A | * | 9/1993 | Kawabe et al. | 360/126 |
| 5,285,340 A | * | 2/1994 | Ju et al. | 360/126 |
| 5,452,164 A | * | 9/1995 | Cole et al. | 360/317 |
| 5,590,008 A | * | 12/1996 | Tanabe et al. | 360/126 |
| 5,640,753 A | * | 6/1997 | Schultz et al. | 29/603.08 |
| 5,700,381 A | * | 12/1997 | Kimura et al. | 216/22 |
| 5,710,683 A | * | 1/1998 | Sundaram | 360/126 |
| 5,828,533 A | * | 10/1998 | Ohashi et al. | 360/126 |
| 5,936,811 A | * | 8/1999 | Seagle | 360/322 |
| 5,969,911 A | * | 10/1999 | Hikami et al. | 360/317 |
| 6,034,848 A | * | 3/2000 | Garfunkel et al. | 360/317 |
| 6,154,346 A | * | 11/2000 | Sasaki | 360/317 |

FOREIGN PATENT DOCUMENTS

| | | | |
|---|---|---|---|
| JP | 01096814 A | | 4/1989 |
| JP | 03-108113 | * | 5/1991 |
| JP | 04-192105 | * | 7/1992 |
| JP | 05046943 A | | 2/1993 |
| JP | 08339508 A | | 12/1996 |

* cited by examiner

Primary Examiner—Craig A. Renner
(74) Attorney, Agent, or Firm—Oliff & Berridge, PLC

(57) ABSTRACT

A combination magnetic head includes a reading head portion and a writing head portion successively stacked on a substrate. A magnetic shield layer is formed on a portion of the substrate between a recessed portion formed in a surface of the substrate and an air bearing surface. A shield gap layer with a magnetoresistive reproducing element embedded therein is formed on the magnetic shield layer. A first magnetic layer has a pole portion formed on the shield gap layer and an extended portion extending along a bottom wall of the recessed portion. A thin film coil has a portion provided on the extended portion and fully embedded within the recessed portion such that the portion of the thin film coil is closer to the substrate than the reproducing element.

7 Claims, 19 Drawing Sheets

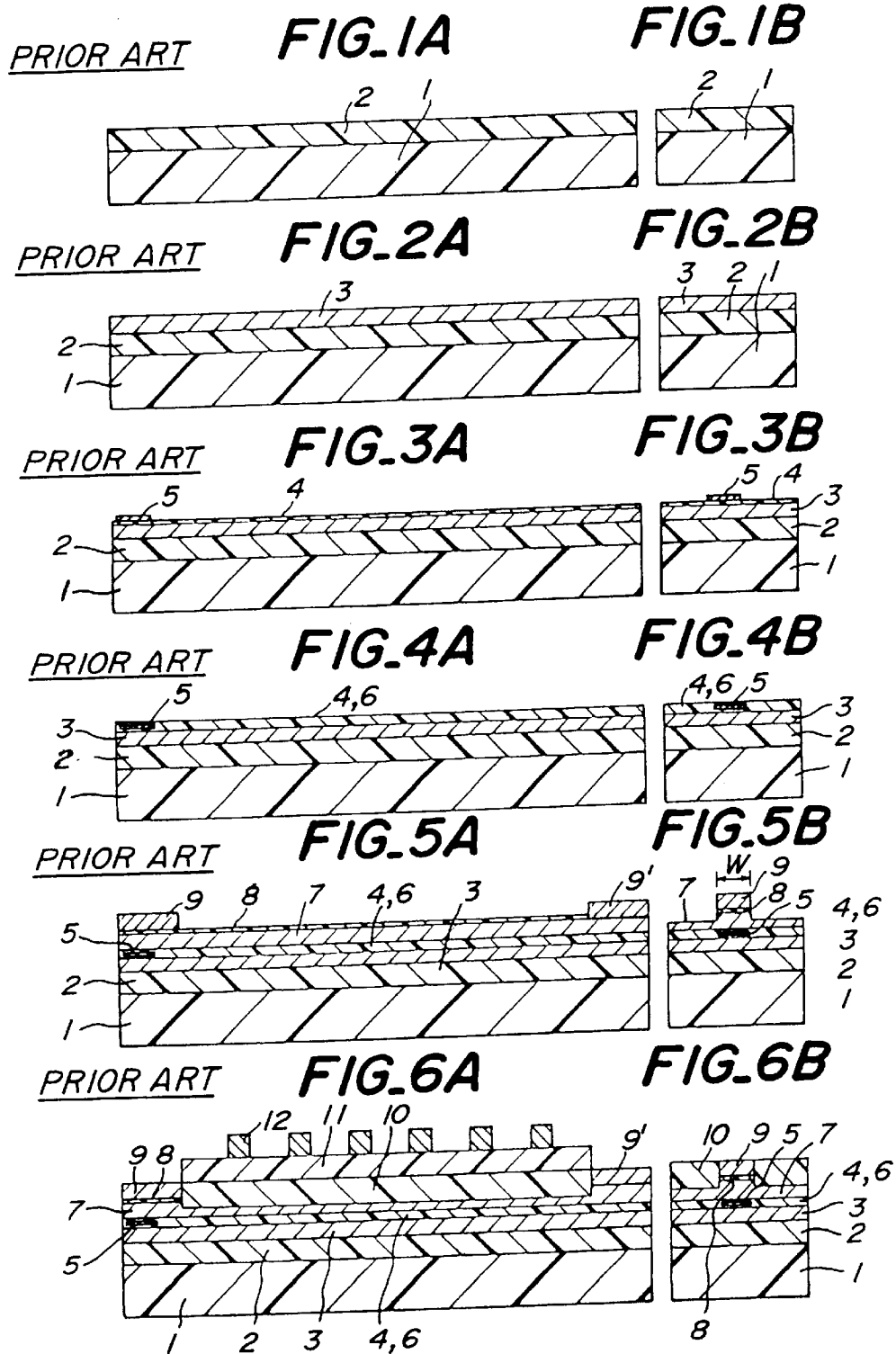

PRIOR ART FIG_7A  FIG_7B
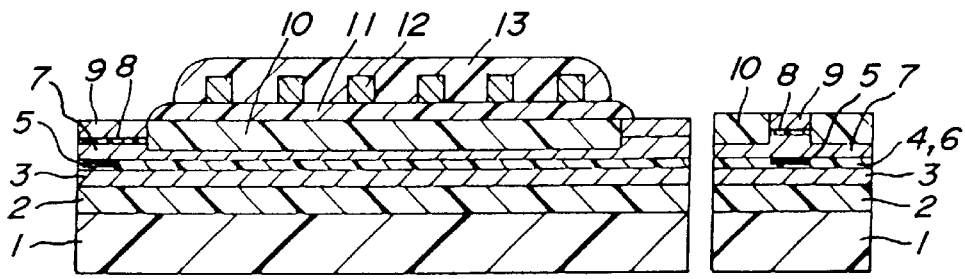
PRIOR ART FIG_8A  FIG_8B
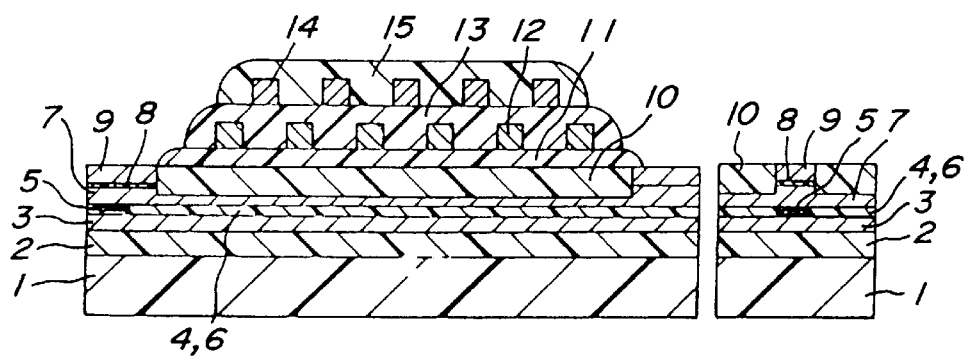
PRIOR ART FIG_9A  FIG_9B
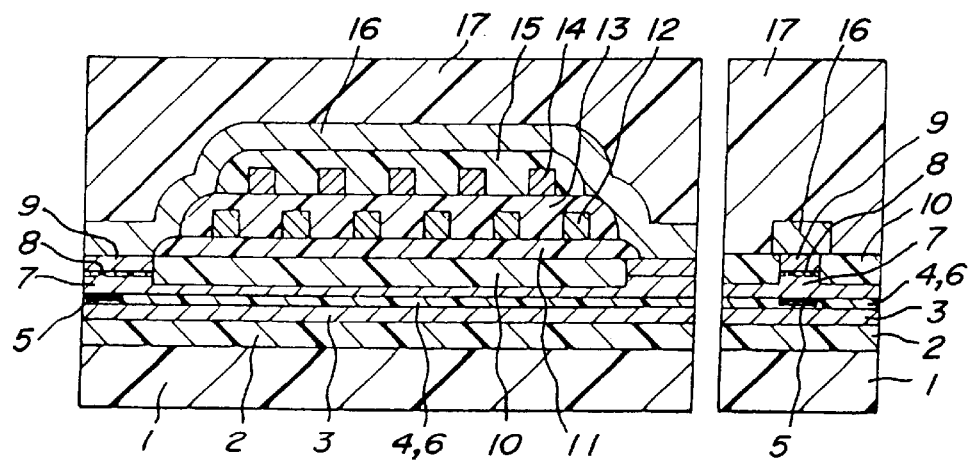

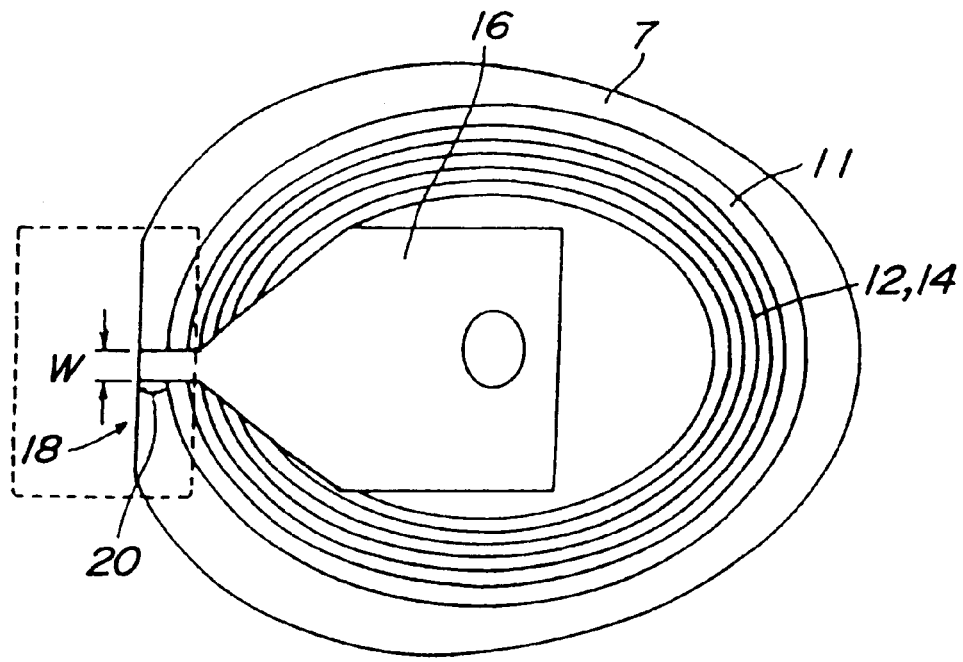
FIG_12
PRIOR ART

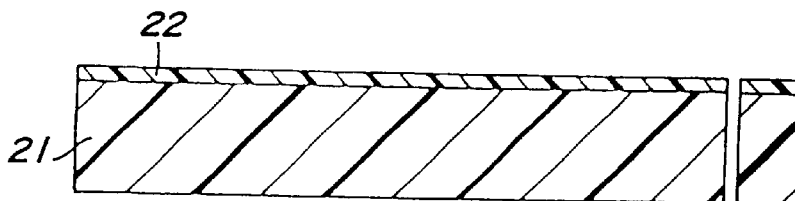 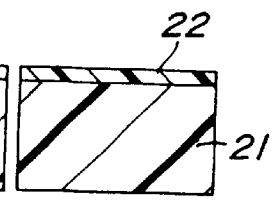
*FIG_13A*  *FIG_13B*
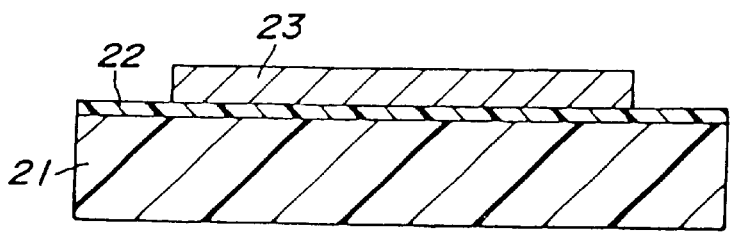 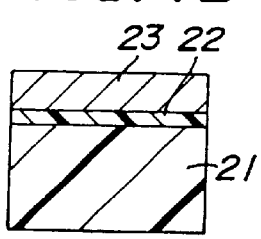
*FIG_14A*  *FIG_14B*
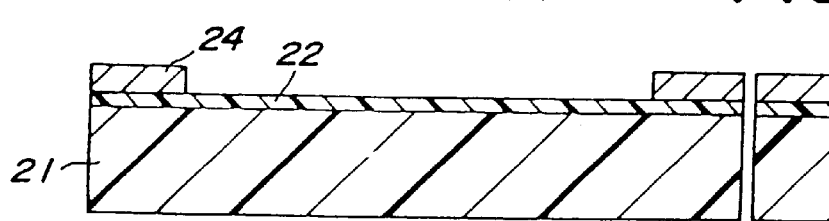 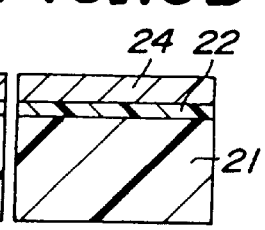
*FIG_15A*  *FIG_15B*
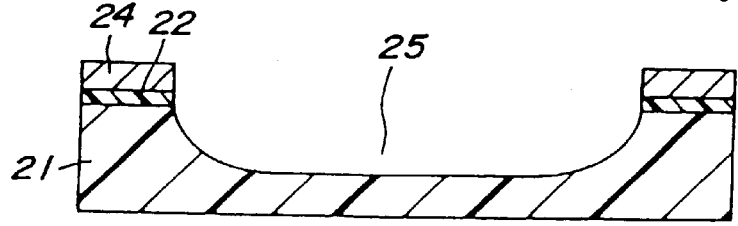 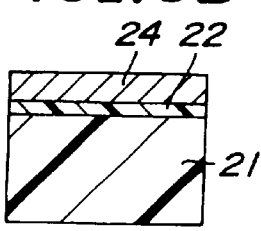
*FIG_16A*  *FIG_16B*
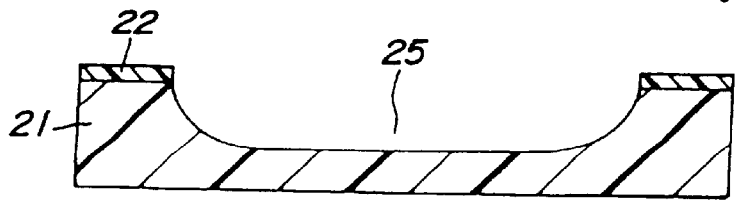 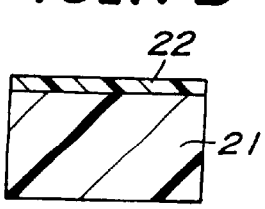
*FIG_17A*  *FIG_17B*

*FIG._18A* 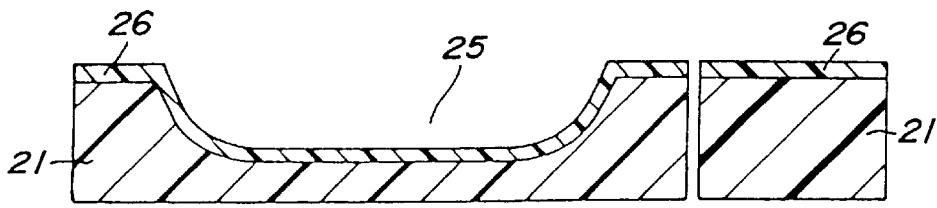 *FIG._18B* 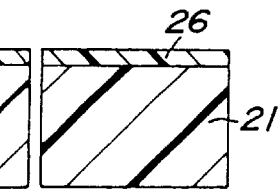
*FIG._19A* 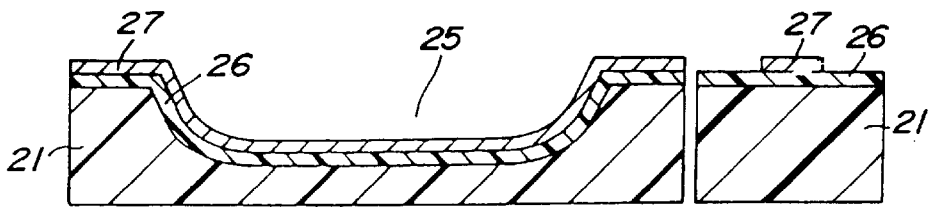 *FIG._19B* 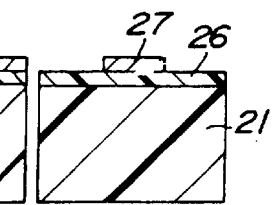
*FIG._20A* 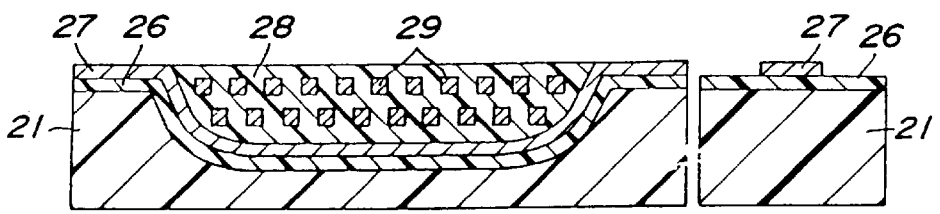 *FIG._20B* 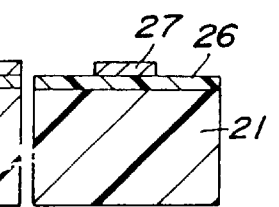
*FIG._21A* 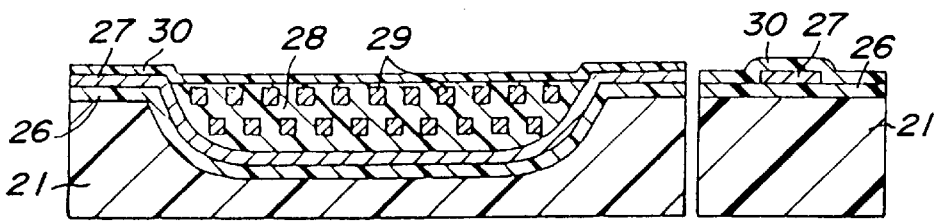 *FIG._21B* 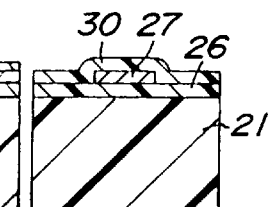
*FIG._22A* 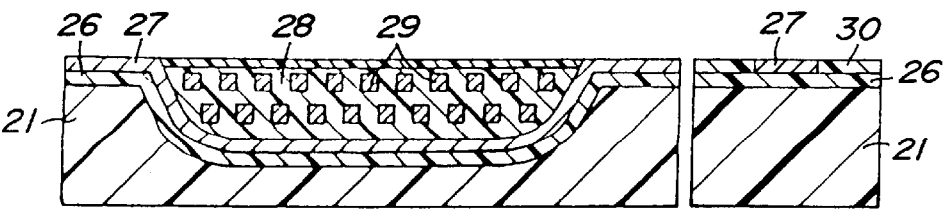 *FIG._22B* 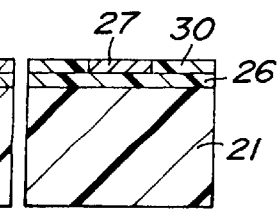

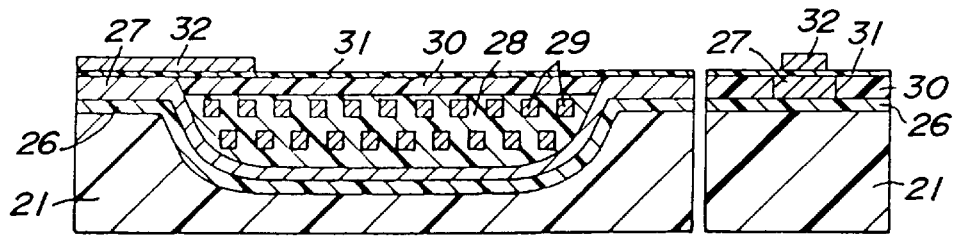
FIG._23A  FIG._23B
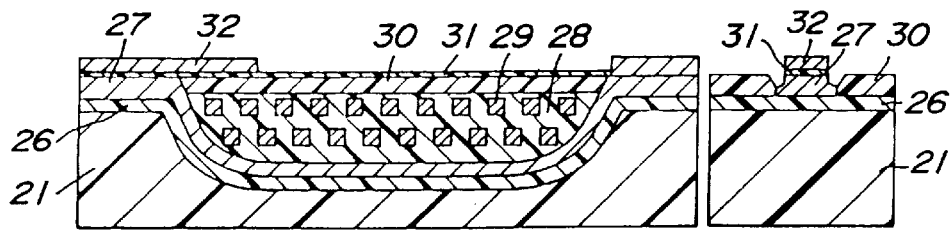
FIG._24A  FIG._24B
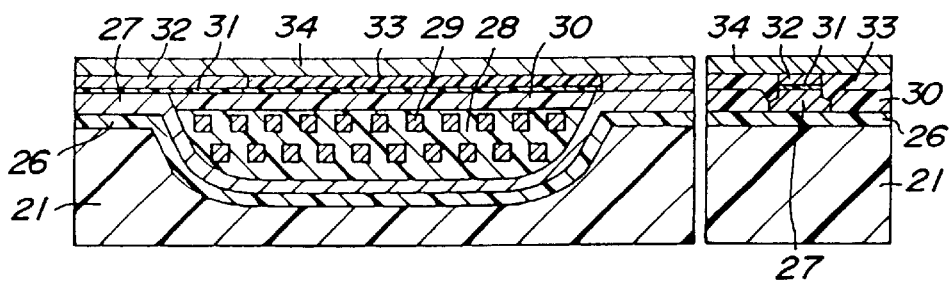
FIG._25A  FIG._25B
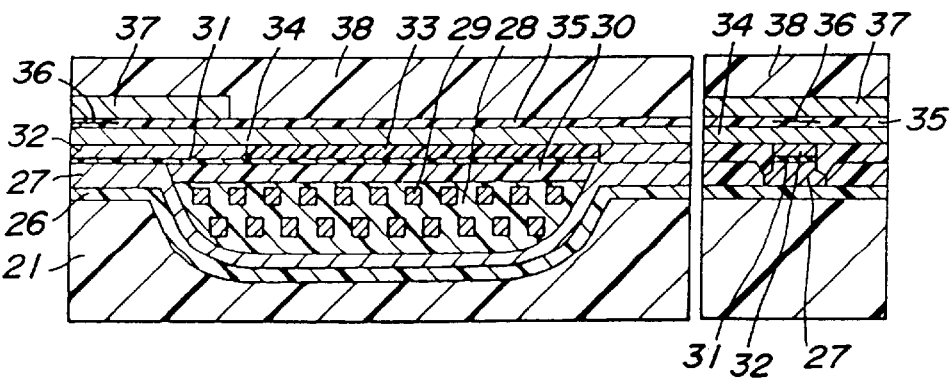
FIG._26A  FIG._26B FIG_27A  FIG_27B
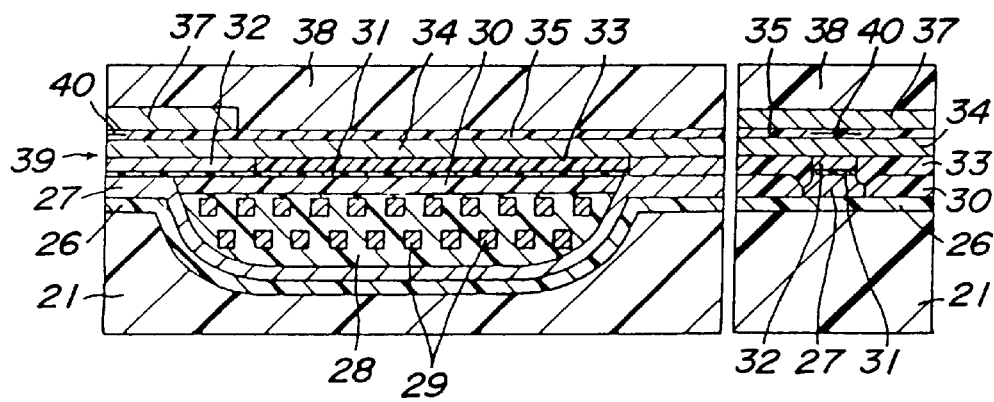
FIG_28
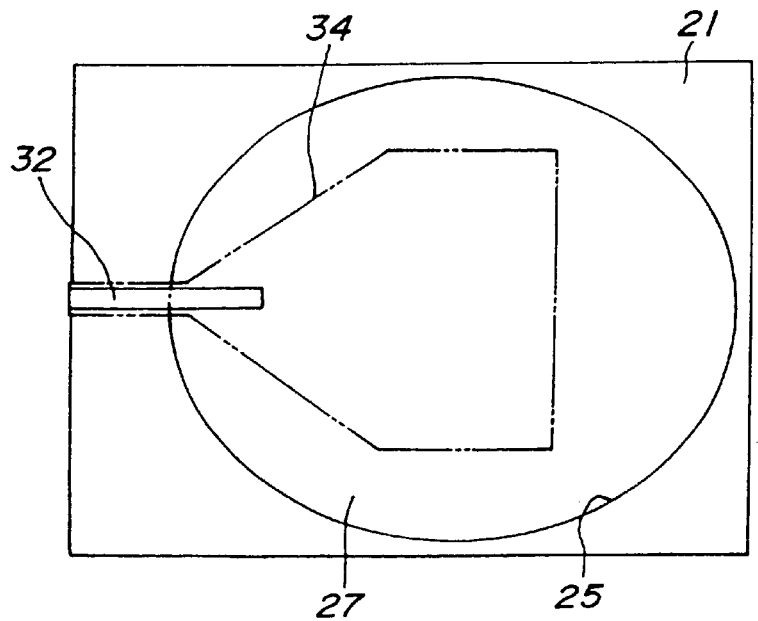

FIG_31
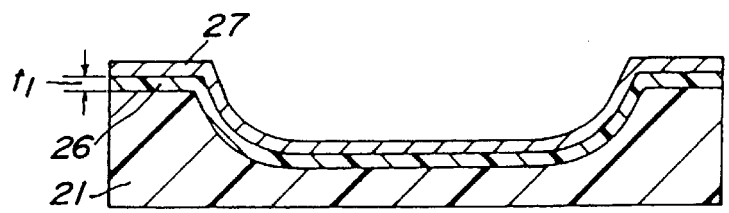
FIG_32
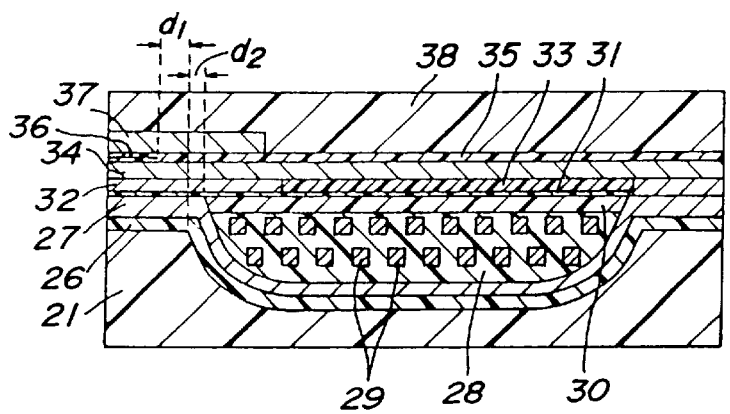
FIG_33
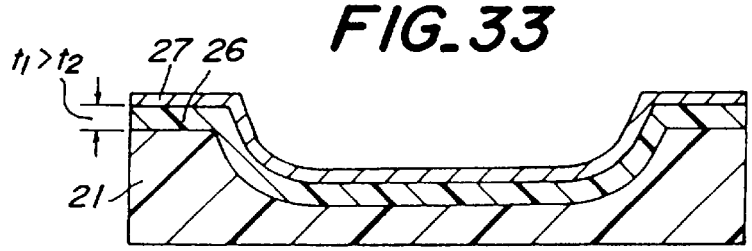
FIG_34
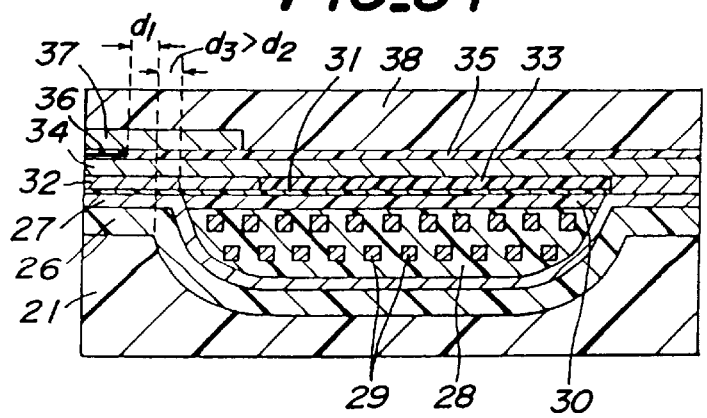

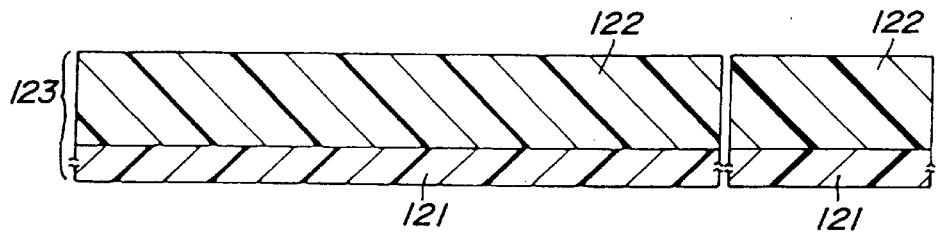
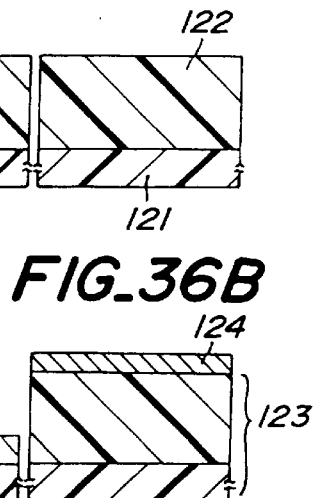
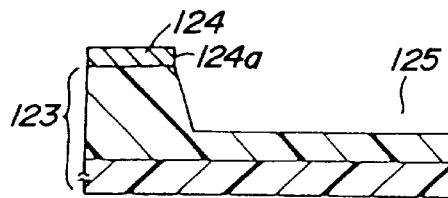
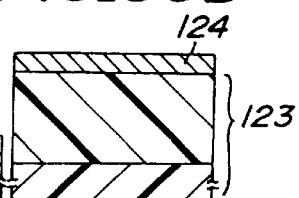
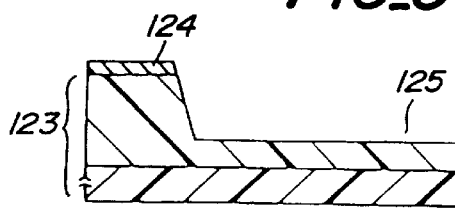
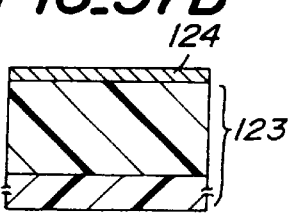
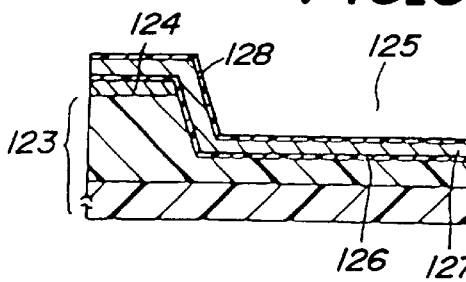
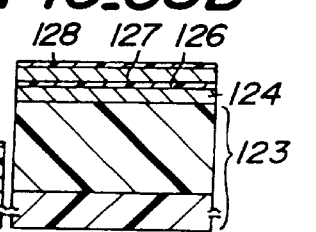

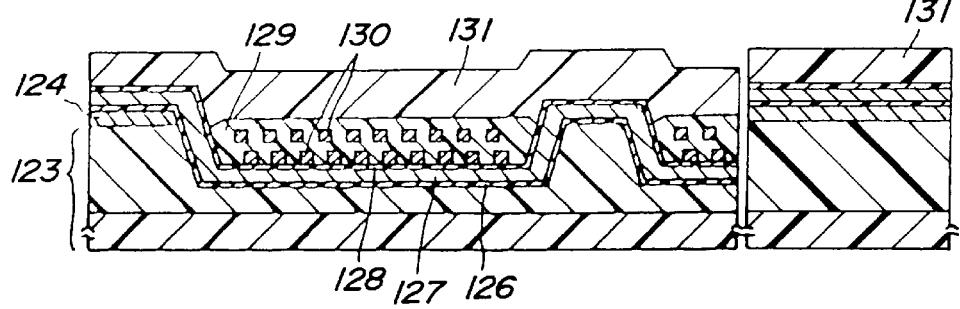
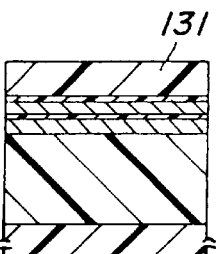
FIG._41A  FIG._41B
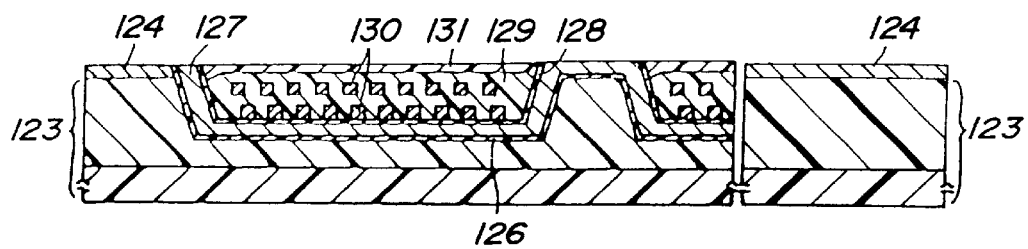
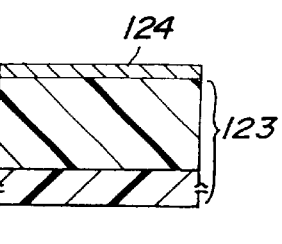
FIG._42A  FIG._42B
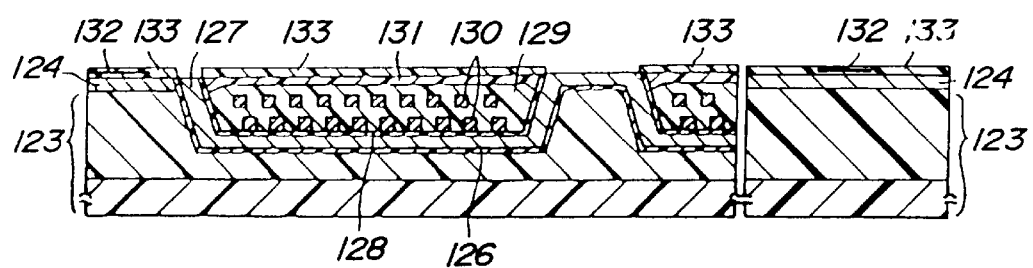
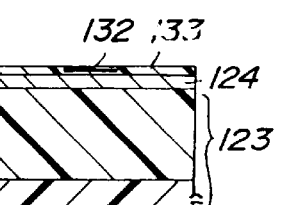
FIG._43A  FIG._43B
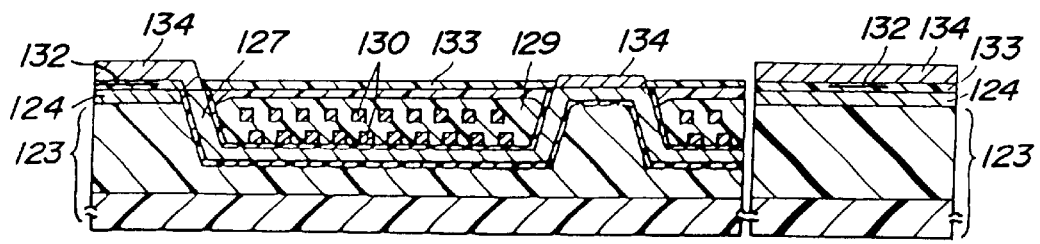
FIG._44A  FIG._44B

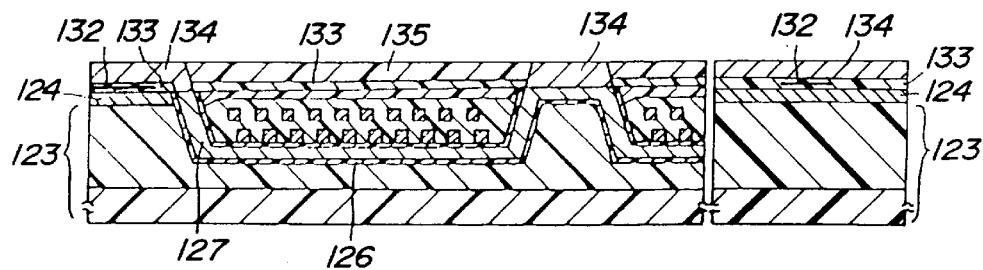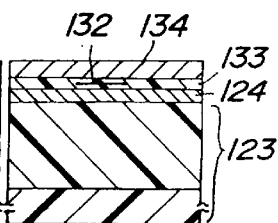
FIG_45A  FIG_45B
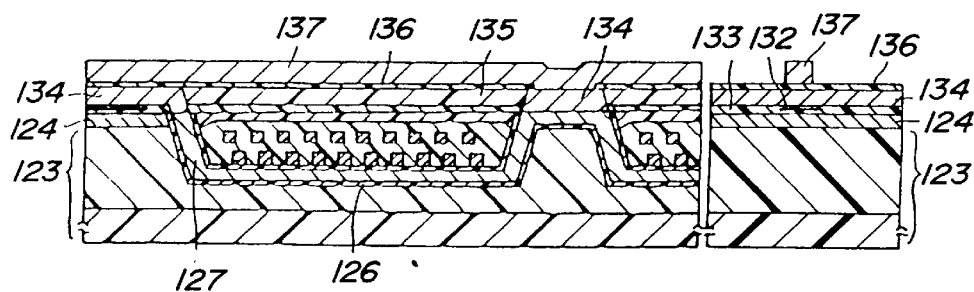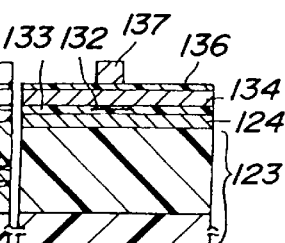
FIG_46A  FIG_46B
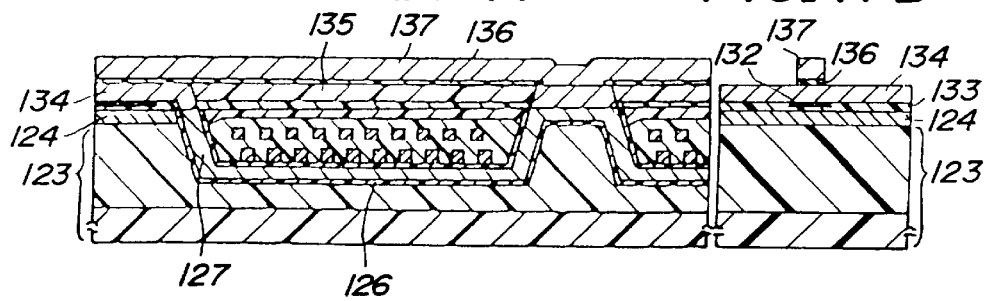
FIG_47A  FIG_47B

FIG_48
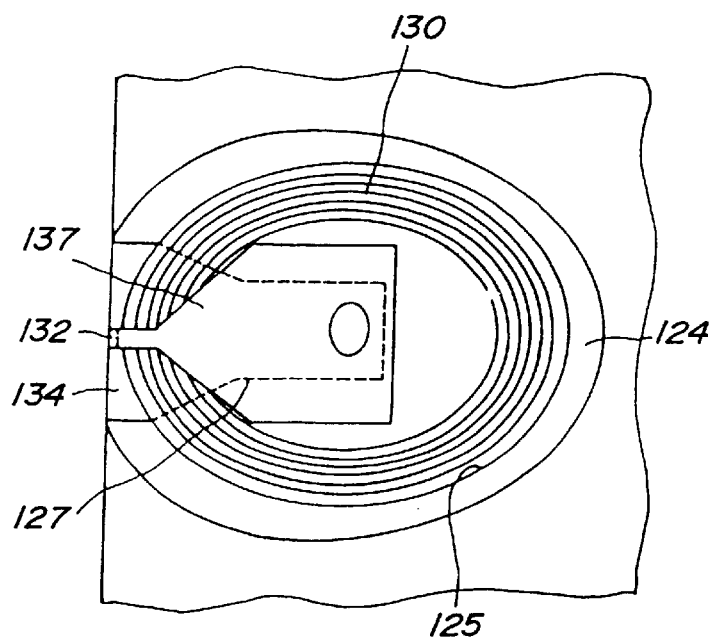
FIG_49A  FIG_49B
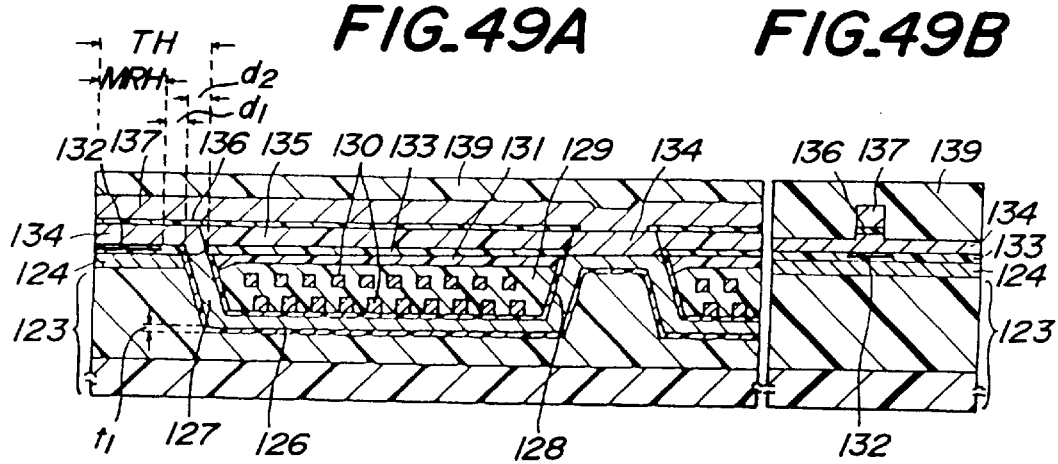

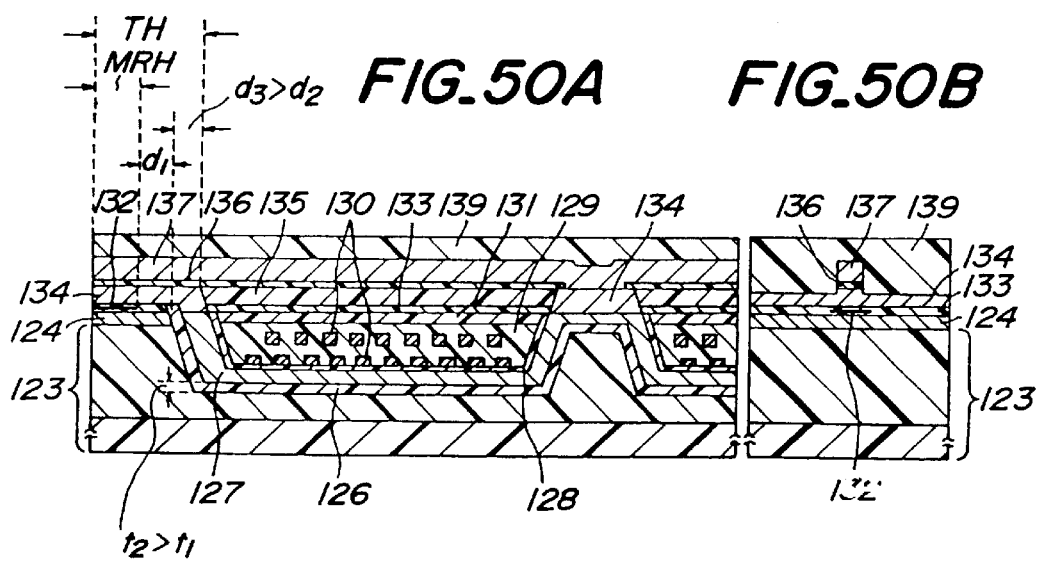

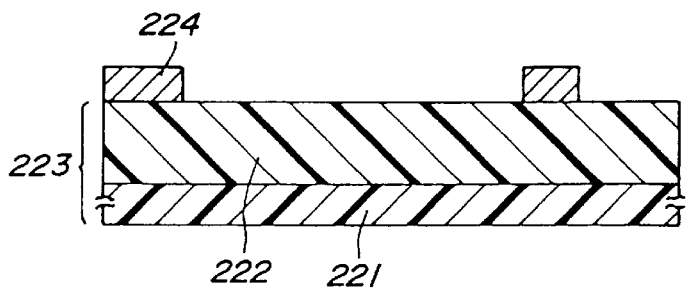
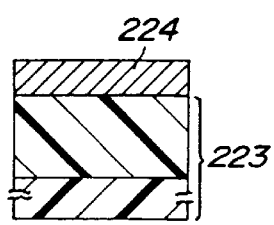
FIG_51A  FIG_51B
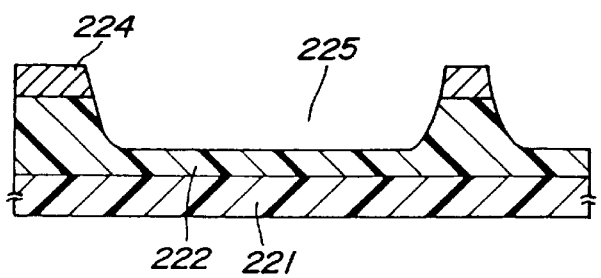
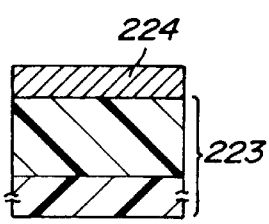
FIG_52A  FIG_52B
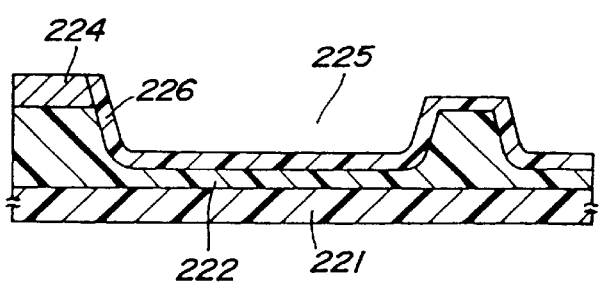
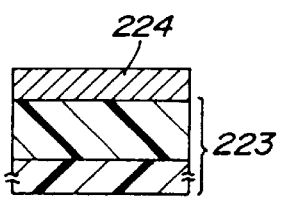
FIG_53A  FIG_53B

THIN FILM MAGNETIC HEAD RECESSED PARTIALLY INTO SUBSTRATE AND INCLUDING PLANARIZATION LAYERS

BACKGROUND OF THE INVENTION

1. Field of the Invention

The present invention relates to a thin film magnetic head and a method of manufacturing the same, and more particularly to a combination type thin film magnetic head constructed by stacking an inductive type writing thin film magnetic head and a magnetoresistive type reading thin film magnetic head.

2. Description of the Related Art

Recently a surface recording density of a hard disc device has been improved, and it has been required to develop a thin film magnetic head having an improved performance accordingly. A combination type thin film magnetic head is constructed by stacking an inductive type thin film magnetic head intended for writing and a magnetoresistive type thin film magnetic head intended for reading on a substrate, and has been practically used. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times.

In the present specification, elements exhibiting a magneto-resistive effect such as AMR and GMR reproducing elements are termed as a magnetoresistive reproducing element or MR reproducing element.

By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than 10 gigabytes.

A height (MR Height: MRH) of a magnetoresistive reproducing element is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type thin film writing magnetic head is a throat height TH. This throat height TH is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

Therefore, in order to improve the performance of the combination type thin film magnetic head having the writing inductive type thin film magnetic head and reading magnetoresistive type thin film magnetic head stacked one on the other, it is important that the recording inductive type thin film magnetic head and reproducing magnetoresistive type thin film magnetic head are formed with a good balance.

FIGS. 1–9 show successive steps for manufacturing a conventional standard thin film magnetic head, in these drawings A depicts a cross-sectional view of a substantial portion of the head and B represent a cross sectional view of a pole portion. Moreover, FIGS. 10–12 are a cross sectional view of a substantial portion of the completed thin film magnetic head, a cross sectional view of the pole portion, and a plan view of the substantial portion of the thin film magnetic head, respectively. It should be noted that the thin film magnetic head is of a combination type in which the inductive type thin film magnetic head for writing is stacked on the reproducing MR element.

First of all, as shown in FIG. 1, an insulating layer 2 consisting of, for example alumina ($Al_2O_3$) is deposited on a substance 1 made of a non-magnetic and electrically insulating material such as AlTiC and having a thickness of about 5–10 $\mu$m.

Next, as shown in FIG. 2, a bottom shield magnetic layer 3 which protects the MR reproduction element of the reproducing head from the influence of an external magnetic field, is formed with a thickness of 3 $\mu$m.

Afterwards, as shown in FIG. 3, after depositing an insulating layer 4 of thickness 100–150 nm serving as a shield gap layer by sputtering alumina, a magnetoresistive layer 5 made of a material having the magnetoresistive effect and constituting the MR reproduction element is formed on the shield gap layer with a thickness of several tens nano meters and is then shaped into a given pattern by the highly precise mask alignment.

Then, as shown in the FIG. 4, an insulating layer 6 is formed such that the magnetoresistive layer 5 is embedded within the insulating layers 4 and 6.

Next, as shown in the FIG. 5, a magnetic layer 7 made of a permalloy is formed with a film thickness of 3 $\mu$m. This magnetic layer 7 has not only the function of the upper shield layer which magnetically shields the MR reproduction element together with the above described bottom shield layer 3, but also has the function of one of poles of the writing thin film magnetic head. Here, the magnetic layer 7 is called a first magnetic layer by taking into account the latter function.

Then, after forming a write gap layer 8 made of a non-magnetic material such as alumina and having a thickness of about 200 nm on the first magnetic layer 7, a second magnetic layer 9 made of a material having a high saturation magnetic flux density such as permalloy (Ni:50 wt %, Fe:50 wt %) and nitride iron (FeN) is formed with a desired shape by the highly precise mask alignment. The second magnetic layer 9 having formed into a given pattern is called a pole chip, and a track width is determined by a width W of the pole chip. Therefore, in order to realize a high surface recording density, it is necessary to decrease the width W.

In this case, a dummy pattern 9' for coupling the bottom pole (first magnetic layer) with the top pole (third magnetic layer) is formed simultaneously. Then, a through-hole can be easily formed by polishing or chemical mechanical polishing (CMP).

In order to prevent an effective width of writing track from being widened, that is, in order to prevent a magnetic flux from being spread at the bottom pole upon the data writing, portions of the gap layer 8 and bottom pole (first magnetic layer) 7 are etched by an ion beam etching such as ion milling. The structure after this process is shown in FIG. 5. This structure is called a trim structure and this portion serves as a pole portion of the first magnetic layer.

Next, as shown in FIG. 6, after forming an insulating layer, for example alumina film 10 with a thickness of about 3 μm, the whole surface is flattened by, for instance CMP.

Subsequently, after forming an electrically insulating photoresist layer 11 into a given pattern by the mask alignment of high precision, a first layer thin film coil 12 made of, for instance a copper is formed on the photoresist layer 11.

Continuously, as shown in FIG. 7, after forming an electrically insulating photoresist layer 13 on the thin film coil 12 by the highly precise mask alignment, the photoresist layer is sintered at a temperature of, for example 250–300° C.

In addition, as shown in FIG. 8, a second layer thin film coil 14 is formed on the flattened surface of the photoresist layer 13. Next, after forming a photoresist layer 15 on the second layer thin film coil 14 with the highly precise mask alignment, the photoresist layer is flattened by performing the sintering process at a temperature of, for example 250° C.

As described above, the reason why the photoresist layers 11, 13 and 15 are formed by the highly precise mask alignment process, is that the throat height TH and MR height MRH are defined on the basis of a position of the edges of the photoresist layers on a side of the pole portion.

Next, as shown in FIG. 9, a third magnetic layer 16 made of, for example a permalloy and having a thickness of 3 μm is selectively formed on the second magnetic layer (pole chip) 9 and photoresist layers 11, 13 and 15 in accordance with a desired pattern. This third magnetic layer 16 is coupled with the first magnetic layer 7 at a rear position remote from the pole portion through the dummy pattern 9', and the thin film coil 12, 14 passes through a closed magnetic circuit composed of the first magnetic layer and the second and third magnetic layers.

Furthermore, an overcoat layer 17 made of alumina is deposited on the exposed surface of the third magnetic layer 16. Finally, a side surface of an assembly at which the magnetoresistive layer 5 and gap layer 8 are formed is polished to form an air bearing surface (ABS) 18 which is to be opposed to the magnetic record medium. During the formation of the air bearing surface 18, the magnetoresistive layer 5 is also polished to obtain a MR reproducing element 19. In this way, the above described throat height TH and the MR height MRH are determined. This condition is shown in FIG. 10. In an actual thin film magnetic head, electric conductors and contact pads for performing the electrical connection to the thin film coils 12, 14 and MR reproduction element 19 are formed, but they are not shown in the drawings.

As shown in FIG. 10, an angle θ (apex angle) between a line S connecting side corners of the photoresist layers 11,13,15 for isolating the thin film coils 12,14 and the upper surface of the third magnetic layers 16 is an important factor for determining the performance of the thin film magnetic head together with the above described throat height TH and MR height.

Moreover, as shown in the plan view of FIG. 12, the width W of the second magnetic layer 9 and a pole portion 20 of the third magnetic layer 16 is small. Since the width of the track recorded on the magnetic record medium is defined by this width W, it is necessary to narrow this width as small as possible in order to achieve a high surface recording density. It should be noted that in this figure, for the sake of convenience, the thin film coils 12, 14 are shown concentrically.

In the method of manufacturing the conventional thin film magnetic head, there is a problem that after forming the thin film coil, the top pole could not be formed precisely on the protruded coil section covered with the insulating photoresist especially along the inclined surface (apex). That is to say, in the known method, the third magnetic layer is formed by first plating a magnetic material such as permalloy on the mountain shaped coil with a height of about 7–10 μm, by applying the photoresist with a thickness of 3–4 μm, and by shaping the magnetic layer into a given pattern by means of the photolithography technology.

Now it is assumed that the photoresist formed on the protruded coil portion into a given pattern should have a thickness of 3 μm or more, a thickness of the photoresist at a bottom or root of the inclined portion would amount to about 8–10 μm.

On the one hand, the top pole formed on the protruded coil portion having a height of about 10 μm as well as on the write gap layer formed on the flat surface should have a narrow portion in the vicinity of the edges of the insulating photoresist layers (for instance layers 11 and 13 in FIG. 7) in order to realize a narrow track width. Therefore, it is necessary to form the pattern having a width of 1 μm by using the photoresist film having a large thickness of 8–10 μm.

However, it is extremely difficult to form the photoresist film having a thickness of 8–10 μm into a pattern having a width of about 1 μm, because upon the light exposure in the photolithography, a pattern deformation might occur due to reflection of light and resolution is reduced due to the thick photoresist layer. In this manner, it is extremely difficult to form a top pole defining precisely a narrow track width by patterning.

Then, as is shown in the above explained conventional thin film magnetic head, in order to write data by means of the pole chip capable of forming the narrow track width, after forming the pole chip, the top pole is formed to be connected to the pole chip. In other words, in order to solve the above problem, a divided structure is adopted, that is, the pole chip for determining the track width and the third magnetic layer for introducing the magnetic flux.

However, the known thin film magnetic head, particularly the recording head formed as in the above manner still has the following problems.

(1) The throat height TH and MR height MRH are determined by taking a position of the edge of the insulating layer isolating the thin film coil on a side of the pole portion as a reference position, but the insulating layer is usually made of an electrically insulating organic photoresist layer and is liable to be deformed by heat. During the formation of the thin film coil, the insulating layer might be deformed by the heating treatment at about 250° C., and a pattern size of the insulating layer changes, and the throat height TH and MR height MRH might be deviated from desired design values. As explained above, the photoresist layer has a very large thickness at this portion, and thus the influence due to the deviation of pattern is also large.

(2) In the above mentioned combination type thin film magnetic head, it is important to attain a good balance between the writing thin film magnetic head and the reading MR element. However, in the conventional combination type thin film magnetic head, for instance when the air bearing surface 18 is polished such that the throat height TH can be formed to a desired design value, the MR height MRH of the MR reproducing element might be also changed, and when the air bearing surface is polished to obtain the MR height MRH having a desired design value, the throat height TH might be deviated from a desired value in this manner, it is difficult to provide a combination type thin film magnetic head having desired characteristics.

(3) In the known method of manufacturing the combination type thin film magnetic head, since the throat height TH of the writing thin film magnetic head and the MR height MRH of the reading MR element have a fixed relationship, there is another problem that it could not respond quickly to various needs of users. That is to say, if it is required to provide a combination type thin film magnetic head, in which a MR height MRH is identical with that of the so far manufactured heads, but a throat height TH is smaller than that of the so far manufactured heads, or if it is required to provide a combination type thin film magnetic head, in which a MR height MRH is smaller than that of the so far manufactured heads although a throat height TH is equal to that of the so far manufactured heads, such requirements could not be fulfilled only by adjusting a polishing amount of the air bearing surface. Therefore, the manufacturing process has to be reviewed from the beginning, and thus such a request could be responded quickly.

(4) Since the pole chip and top pole are contacted with each other via a small contact area, and they are brought into contact with each other at right angles, the magnetic flux is liable to be saturated at the contact portion, and therefore a satisfactorily high writing characteristic could not be obtained.

(5) Since a positional relation between the pole chip and the top pole is determined by the alignment of the photoresist layer, a center line of the pole chip viewed from the air bearing surface might deviate largely from a center line of the top pole. Then, the data writing might be carried out by means of the magnetic flux leaked from the top pole, and the effective track width might be increased and data might be erroneously recorded on an adjacent track.

SUMMARY OF THE INVENTION

It is an object of the present invention to provide a thin film magnetic head, in which the above mentioned various problems can be solved advantageously, a pattern size of an insulating layer constituting a reference position with respect to an air bearing surface is not deviated by a heating treatment during the formation of a thin film coil, and therefore a throat height TH having a desired design value can be attained stably.

It is another object of the invention to provide a thin film magnetic head, in which a contact area between a pole chip and a top pole can be effectively increased to completely or substantially completely avoid a saturation of a magnetic flux at a pole portion.

It is another object of the invention to provide a thin film magnetic head, in which an increase in an effective track width and a decrease in a manufacturing yield can be avoided.

It is another object of the invention to provide a method of manufacturing such thin film magnetic heads having excellent characteristics in an efficient and accurate manner.

It is another object of the invention to provide a method of manufacturing a combination type thin film magnetic head, in which a pattern of an insulating layer defining a positional reference with respect to an air bearing surface is not deviated by a heating treatment during the formation of a thin film coil to obtain the throat height TH, apex angle $\theta$ and MR height MRH having desired design values, and the throat height TH and MR height MRH can be controlled independently from each other, while a good balanced condition between the throat height and the MR height is not destroyed so that users' requests for these heights can be satisfied promptly.

According to a first aspect of the invention, a thin film magnetic head comprises:

a first magnetic layer having a pole portion;

a second magnetic layer having a pole portion which is to be opposed to a magnetic record medium and defines a width of record tracks, and an end surface which constitutes an air bearing surface together with an end surface of said pole portion of said first magnetic layer;

a third magnetic layer which is brought into contact with said second magnetic layer on a side opposite to said first magnetic layer and is magnetically coupled with said first magnetic layer at a portion remote from said air bearing surface;

a gap layer made of a non-magnetic material and being interposed between the pole portion of the first magnetic layer and the pole portion of the second magnetic layer at least at the air bearing surface;

a thin film coil having a portion which is arranged between said first magnetic layer and said second and third magnetic layers with interposing an insulating layer therebetween to generate a writing magnetic flux for the magnetic record medium; and a substrate which supports said first, second and third magnetic layers, gap layer, insulating layer and thin film coil;

wherein said second magnetic layer is extended up to a rear region beyond said pole portion to form an extended rear portion which is brought into contact with the third magnetic layer, and a part of said first magnetic layer except for at least said pole portion and the thin film coil isolated by said insulating layer are embedded within a recessed portion formed in the substrate.

In a preferable embodiment of the thin film magnetic head according to the first aspect of the invention, a width of the rear portion of said second magnetic layer is larger than that of the pole portion of the second magnetic layer constituting the pole chip. In this case, a width of the rear portion may be gradually increased. This expanded angle of the rear portion of the second magnetic layer is preferably set to 30–180°.

Moreover, in a preferable embodiment of the thin film magnetic head according to the first aspect of the invention, said second magnetic layer is made of a material having a high saturation magnetic flux density such as a permalloy.

Furthermore, a portion of the first magnetic layer which is opposed to the pole portion of the second magnetic layer via the gap layer may preferably be protruded toward the second magnetic layer, and a width of the protruded portion is substantially equal to a width of the pole portion of the second magnetic layer. The protruded structure of the first magnetic layer may be preferably formed by etching, while the pole portion of the second magnetic layer is used as a mask.

In another preferable embodiment of the thin film magnetic head according to the first aspect of the present invention, the thin film magnetic head is constructed as a combination type thin film magnetic head by arranging a magnetoresistive type reproducing element for reading on a surface of the third magnetic layer opposite to the surface which is brought into contact with said second magnetic layer such that an end surface of the reproducing element is exposed on the air bearing surface.

According to a second aspect of the invention, a method of manufacturing a thin film magnetic comprises:

the step of forming a recessed portion in a surface of a substrate;

the step of forming a first insulating layer on the surface of the substrate including a surface of the recessed portion;

the step of forming a first magnetic layer having a pole portion on at least a part of the surface of the substrate on which said first insulating layer is formed;

the step of forming a thin film coil within the recessed portion such that the thin film coil is isolated by a second insulating layer;

the step of forming a gap layer on at least said pole portion of the first magnetic layer as well as on a surface of said second insulating layer after making said first magnetic layer and second insulating layer to have a coplanar surface;

the step of forming a second magnetic layer on said gap layer such that the second magnetic layer extends over the pole portion of the first magnetic layer as well as over a rear region beyond the pole portion;

the step of forming a third magnetic layer such that the third magnetic layer is brought into contact with the second magnetic layer and is brought into contact with said first magnetic layer at a rear portion remote from an air bearing surface; and the step of forming the air bearing surface to be opposed to a magnetic record medium by polishing said substrate, pole portions of said first and second magnetic layers and gap layer sandwiched by these pole portions while an edge of the recessed portion formed in the substrate is used as a positional reference.

In a preferable embodiment of the method of manufacturing the thin film magnetic head according to this second aspect of the invention, upon forming said second magnetic layer, a width of the rear portion thereof beyond the pole portion is gradually increased. In this case, this expanded angle may be preferably set to 30–180°.

In another preferable embodiment of the method of manufacturing the thin film magnetic head according to the second aspect of the invention, after forming said second magnetic layer, the pole portion of said first magnetic layer is etched while the pole portion of the second magnetic layer is used as a mask. This etching may be carried out such that a part of a thickness of the first magnetic layer is removed or may be conducted to remove the first magnetic layer over its whole thickness.

Moreover, in another preferable embodiment of the method of manufacturing a thin film magnetic head according to the second aspect of the invention, said step of forming the recessed portion in the surface of the substrate comprises:

the step of forming a photoresist layer selectively on a part of the surface of the substrate at which the recessed portion is to be formed;

the step of forming a metal or metal compound layer constituting a mask by a plating, while said photoresist layer is used as a mask;

the step of forming a mask by removing said photoresist layer, said mask having an opening corresponding to the recessed portion to be formed; and the step of forming the recessed portion in the surface of the substrate by a reactive ion etching through the opening.

In this case, the reactive ion etching may be conducted by using, as a reactive gas, a fluorine series gas such as $CF_4$ and $SF_6$ or a chlorine series gas such as $BCl_3$ and $Cl_2$ or one of these gas diluted with an oxygen or an inert gas.

Before forming the mask made of metal or metal compound, an insulating layer may be formed on the substrate. Then, after forming the recessed portion by the etching, said mask made of metal or metal compound may be removed by etching while said insulating layer is used as an etching stopper. It is a matter of course that said mask made of metal or metal compound may be remained.

The reactive ion etching can form the deep recessed portion having a depth not less than 5 $\mu$m in an accurate manner. In this case, an inclination angle of a side wall of the recessed portion may be preferably set to 45–75°, particularly 55–65°. It should be noted that the thus formed recessed portion has a highly smooth inner wall.

In another preferable embodiment of the method of manufacturing the thin film magnetic head according to the second aspect of the present invention, a magnetoresistive type reproducing element for reading is formed on said third magnetic layer such that the reproducing element is electrically isolated and magnetically shielded to construct the thin film magnetic head as a combination type thin film magnetic head.

Upon manufacturing such a combination type thin film magnetic head, before forming the first magnetic layer, a first shield layer for effecting a magnetic shield on the substrate, a magnetoresistive material layer is formed such that this layer is embedded within an insulating layer, then said first magnetic layer which also serves as a second shield is formed, and during the polishing process for forming the air bearing surface, said first shield layer as well as said magnetoresistive material layer are polished to form the magnetoresistive type reproducing element whose end surface is exposed on the air bearing surface.

Furthermore, according to a third aspect of the invention, a method of manufacturing a combination type thin film magnetic head having an inductive type writing thin film magnetic head and a magnetoresistive type reading thin film magnetic head for reading successively stacked on a substrate comprises:

the step of forming a recessed portion in a surface of a substrate;

the step of forming a first insulating layer on an inner surface of the recessed portion as well as on a part of the surface of the substrate;

the step of forming a first magnetic layer on a surface of said first insulating layer;

the step of forming a thin film coil within the recessed portion such that the thin film coil is isolated by a second insulating layer;

the step of forming a gap layer made of a non-magnetic material on surfaces of said first magnetic layer and second insulating layer;

the step of forming a second magnetic-layer on a surface of said gap layer such that the second magnetic layer is opposed to a pole portion of the first magnetic layer and is brought into contact with said first magnetic layer at a portion remote from an air bearing surface;

the step of forming a reading magnetoresistive layer on a surface of said second magnetic layer such that the magnetoresistive layer is embedded within a shield gap layer in an electrically isolated and magnetically shielded manner;

the step of forming a third magnetic layer on said shield gap layer; and the step of forming the air bearing surface to be opposed to a magnetic record medium by polishing said substrate, pole portions of said first and second magnetic layers, gap layer sandwiched by these pole portions, shield gap layer, magnetoresistive layer and third magnetic layer, while an edge of the recessed portion formed in the substrate is used as a positional reference;

wherein a throat height of the inductive type thin film writing magnetic head is adjusted independently from a MR height of the magnetoresistive type reading thin film magnetic head by controlling a thickness of said first insulating layer.

According to a fourth aspect of the present invention, a method of manufacturing a combination type thin film magnetic head having an inductive type writing thin film magnetic head and a magnetoresistive type reading thin film magnetic head for reading stacked on a substrate comprises:

the step of forming a recessed portion in a surface of a substrate;

the step of forming a first insulating layer on an inner surface of the recessed portion as well as on a part of the surface of the substrate;

the step of forming a first magnetic layer on said first insulating layer;

the step of forming a thin film coil within the recessed portion such that the thin film coil is isolated by a second insulating layer;

the step of forming a gap layer made of a non-magnetic material on said first magnetic layer and second insulating layer;

the step of forming a second magnetic layer on said gap layer, said second magnetic layer having a pole portion which is opposed to a pole portion of the first magnetic layer and a rear portion which extends beyond the pole portion;

the step of forming a third magnetic layer which is brought into contact with said second magnetic layer as well as with said first magnetic layer at a portion remote from an air bearing surface;

the step of forming a reading magnetoresistive layer on said second magnetic layer such that the magnetoresistive layer is embedded within a shield gap layer in an electrically isolated and magnetically shielded manner;

the step of forming a fourth magnetic layer on said shield gap layer; and the step of forming the air bearing surface to be opposed to a magnetic record medium by polishing said substrate, first, second and second magnetic layers, gap layer, shield gap layer, magnetoresistive layer and fourth magnetic layer, while an edge of the recessed portion formed in the substrate is used as a positional reference;

wherein a throat height of the inductive type thin film writing magnetic head is adjusted independently from a MR height of the magnetoresistive type reading thin film magnetic head by controlling a thickness of said first insulating layer.

Further, according to a fifth aspect of the invention, a method of manufacturing a combination type thin film magnetic head having an inductive type writing thin film magnetic head and a magnetoresistive type reading thin film magnetic head for reading stacked on a substrate comprises:

the step of forming a first magnetic layer on a surface of a substrate in accordance with a given pattern;

the step of forming a recessed portion in the surface of the substrate, while said first magnetic layer is used as a mask;

the step of forming a first insulating layer on an inner surface of the recessed portion;

the step of forming a reading magnetoresistive layer on said first magnetic layer such that the magnetoresistive layer is embedded within a shield gap layer;

the step of forming a second magnetic layer on said first insulating layer within said recessed portion as well as on said shield gap layer;

the step of forming a thin film coil on said second magnetic layer within the recessed portion such that the thin film coil is isolated by a second insulating layer;

the step of forming a gap layer made of a non-magnetic material on said second magnetic layer and second insulating layer;

the step of forming a third magnetic layer which is opposed to said second magnetic layer via said gap layer and is brought into contact with said second magnetic layer at a portion remote from an air bearing surface; and the step of forming the air bearing surface to be opposed to a magnetic record medium by polishing said substrate, first magnetic layer, shield gap layer, second magnetic layer, gap layer and third magnetic layer, while an edge of the recessed portion formed in the substrate is used as a positional reference;

wherein a throat height of the inductive type thin film writing magnetic head is adjusted independently from a MR height of the magnetoresistive type reading thin film magnetic head by controlling a thickness of said first insulating layer.

In the methods according to the above mentioned third to fifth aspects of the present invention, the throat height can be controlled independently from the MR height by adjusting a thickness of the first insulating layer formed within the recessed portion. For instance, even when the air bearing surface is polished such that the MR height becomes constant, the throat height can be adjusted by controlling a thickness of the first insulating layer. In this manner, the throat height can be formed to have a desired design value without loosing a good balanced condition between the throat height and the MR height. Moreover, since a thickness of the first insulating layer can be controlled very simply, various needs of users can be satisfied in a prompt manner. By controlling a thickness of the first insulating layer within a range of 0.2–0.8 $\mu$m, it is possible to adjust the throat height within a substantially same range.

Furthermore, the apex angle is defined by an inclination angle of the side wall of the recessed portion, and this angle is not varied by the high temperature process for photoresist layers. Therefore, it is possible to obtain the apex angle having a desired design value.

In case of forming the recessed portion in the substrate, it is preferable to conduct the reactive ion etching through the metal or metal compound mask. By using the reactive ion etching, the deep recessed portion having a depth not less than 5 μm, an inclination angle of a side wall of the recessed portion of 45–75°, particularly 55–65°, and a highly smoothed inner surface can be formed in an accurate and efficient manner.

The reactive ion etching for forming the recessed portion may be conducted by using, as a reactive gas, a fluorine series gas such as $CF_4$ and $SF_6$ or a chlorine series gas such as $BCl_3$ and $Cl_2$ or one of these gases diluted with an oxygen or inert gas.

Furthermore, before forming the mask made of metal or metal compound, an insulating layer may be formed on the substrate. Then, after forming the recessed portion by the etching, said mask made of metal or metal compound may be removed by etching while said insulating layer is used as an etching stopper. It should be noted that said mask made of metal or metal compound may be remained as in the methods according to the fourth and fifth aspects of the present invention.

Moreover, in the method according to the above mentioned fourth aspect of the present invention, upon forming said second magnetic layer, a width of the rear portion beyond the pole portion may be widened than the pole portion. In this case, it is preferable that the rear portion of the second magnetic layer is gradually increased with an expansion angle of 30–180°.

Also in the methods according to the third to fifth aspects of the invention, after forming the second magnetic layer, the pole portion of the first magnetic layer may be etched to constitute the trim structure while the pole portion of said second magnetic layer is used as a mask.

BRIEF DESCRIPTION OF THE DRAWINGS

FIGS. 1A, 1B–9A, 9B are cross sectional views showing successive steps of a known method of manufacturing a conventional typical combination type thin film magnetic head;

FIG. 12 is a plan view of the convention combination type thin film magnetic head;

FIGS. 13A, 13B–26A, 26B are cross sectional views illustrating successive steps of a first embodiment of the method of manufacturing the thin film magnetic head according to this invention;

FIGS. 27A and 27B are cross sectional views depicting the completed thin film magnetic head;

FIG. 28 is a plan view showing the configuration of the second magnetic layer in the first embodiment;

FIG. 31 is a cross sectional view depicting a condition in which an element separating insulating layer having a thickness of $t_1$ is formed in the method of manufacturing the thin film magnetic head according to the invention;

FIG. 32 is a cross sectional view showing the completed thin film magnetic head;

FIG. 33 is a cross sectional view depicting a condition in which an element separating insulating layer having a thickness of $t_2$ is formed in the method of manufacturing the thin film magnetic head according to the invention;

FIG. 34 is a cross sectional view showing the completed thin film magnetic head;

FIGS. 35A, 35B–38A, 38B are cross sectional views showing successive steps of a second embodiment of the method of manufacturing the thin film magnetic head according to the invention;

FIGS. 40A, 40B–47A, 47B are cross sectional views showing succeeding steps of the second embodiment;

FIG. 48 is a plan view illustrating the composite type thin film magnetic head in the step of FIG. 47;

FIGS. 49A and 49B are cross sectional views depicting a step next to the step of FIG. 47;

FIGS. 50A and 50B are cross sectional views showing the combination type thin film magnetic head in which the insulating layer has a large thickness; and FIGS. 51A, 51B–59A, 59B are cross sectional views illustrating successive steps of a third embodiment of the method of manufacturing the combination type thin film magnetic head according to the present invention.

DESCRIPTION OF THE PREFERRED EMBODIMENTS

Figure 10:
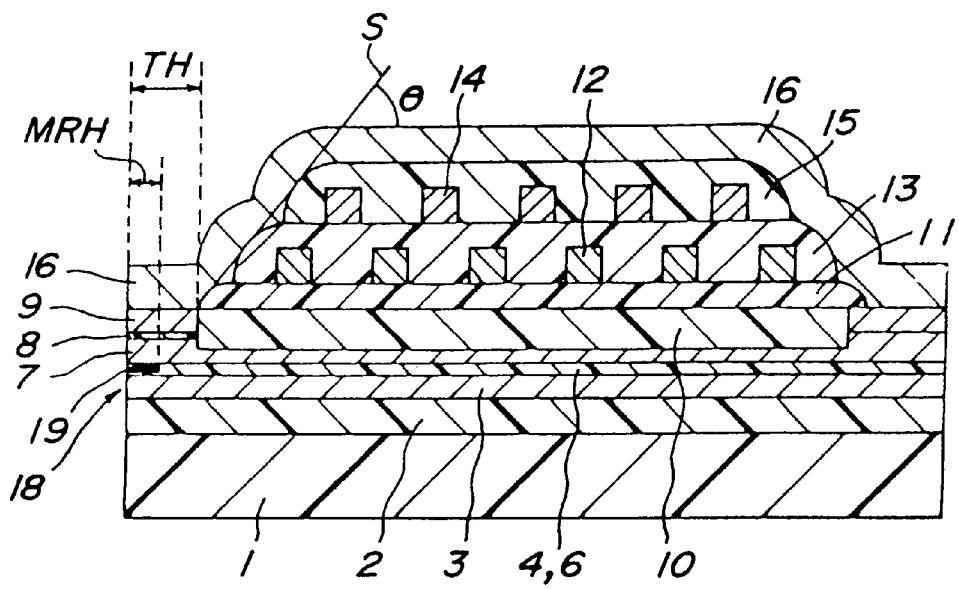
FIG. 10 is a cross sectional view depicting the completed conventional combination type thin film magnetic head.
Figure 11:
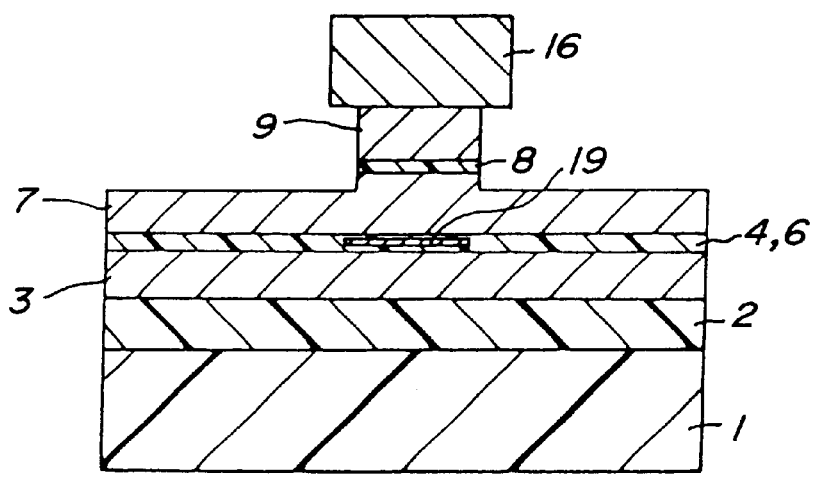
FIG. 11 is a cross sectional view showing a pole portion of the conventional combination type thin film magnetic head.
Figure 29:
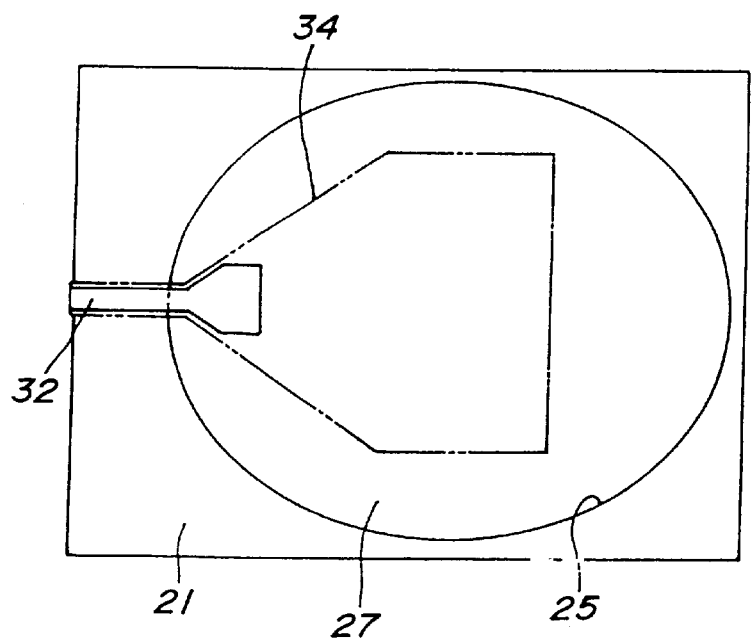
FIG. 29 is a plan view illustrating a configuration of the second magnetic layer of another embodiment of the thin film magnetic head according to this invention.

FIGS. 13–27 show successive steps of a first embodiment of the method of manufacturing the thin film magnetic head according to the invention, and FIGS. 28 and 29 are plan views illustrating the thin film magnetic head during the manufacturing process. In FIGS. 13–27, A denotes a cross sectional view cut along a line perpendicular to the air bearing surface and B denotes a cross sectional view of a pole portion cut along a line parallel with the air bearing surface. The thin film magnetic head of the present embodiment a reversed combination type tin film magnetic head, in which an inductive type writing thin film magnetic head is provided on a substrate and a magnetoresistive type reading thin film magnetic head is arranged on the inductive type thin film magnetic head.

At first, as shown in FIG. 13, an insulating layer 22 made of alumina ($Al_2O_3$) and having a thickness of about 0.3–0.5 μm is formed sputtering on one surface of a substrate main body 21 made of AlTiC. It should be noted that a silicon oxide layer may be used instead of the alumina layer, and the deposition may be carried out by CVD (Chemical Vapor Deposition) instead of sputtering. In this specification, an insulating layer means a film having at least an electrically insulation property and may have or may not have a non-magnetic property. In general, a material such as alumina having both the electrically insulating property and non-magnetic property is used, and therefore the insulating layer and the non-magnetic layer are sometimes used to have the same meaning.

Next, as shown in FIG. 14, a photoresist layer 23 is selectively formed on the alumina insulating layer 22, and then as depicted in FIG. 15, a metal layer 24 made of a permalloy is formed by plating with a thickness of about 5 μm, said metal layer serving as a mask which defines an etching profile for a recessed portion to be formed later by performing the etching for the substrate 21. This metal layer 24 may be made of other metal or metal compound such as copper, nickel, nickel boron instead of permalloy. Since the metal layer 24 is used as a mask for the formation of the recessed portion in the substrate, the permalloy may have any desired composition.

Next, as illustrated in FIG. 16, the etching is carried out using the metal layer 24 as a mask to form a recessed portion 25 having a given profile in a surface of the substrate 21. In the present embodiment, this etching is of a reactive ion etching which is one of dry etchings, but ion beam milling such as ion milling, wet etching and so on may be used. According to the invention, parameters of the thin film magnetic head such as throat height, MR height and apex angle θ are determined by a profile of the recessed portion 25, and therefore the dry etching is preferably used owing to a fact that a depth and a configuration of a side wall can be controlled precisely with an order of 0.1 μm and the recessed portion can be formed at a higher speed. As a gas used in the dry etching, a fluorine series gas such as $CF_4$ and $SF_6$, a chlorine series gas such as $BCl_3$ and $Cl_2$ or one of these gases diluted with $O_2$ or inert gas such as $N_2$, Ar and He.

In the present embodiment, since the apex angle θ is determined by an inclination angle of the side wall of said recessed portion 25, it is preferable to form the recessed portion such that the side wall of the recessed portion has the inclination angle of 45–70°, particularly 55–65° in accordance with the desired apex angle.

When the recessed portion 25 is formed by the dry etching as stated above, although the smoothness of the inner wall of the recessed portion is superior to that formed by other processes, there are formed sharp protrusions and depressions of about 0.1–0.5 μm. If such protrusions and depressions might cause undesired degradation in the insulating property of first magnetic layer and thin film coil of the thin film magnetic head to be formed within the recessed portion 25, the protrusions and depressions may be removed by the argon sputtering. After forming the recessed portion in this manner, the metal layer 24 serving as the mask is removed as illustrated in FIG. 17. It should be noted that according to the invention, such sputtering is not always required and it is not necessary to remove the metal layer 24.

Next, as shown in FIG. 18, an alumina insulating layer 26 having a thickness of 0.3–5.0 μm is formed by sputtering, said insulating layer serving to separate the thin film magnetic head element from the substrate 21. It should be noted that in the present embodiment, the alumina insulating layer 22 serving as a buffer layer is remained, but it may be removed together with the plated material layer. In this case, the alumina insulating layer 22 becomes integral with the alumina insulating layer 26, and therefore in FIG. 18, the alumina insulating layer 22 is not shown. Furthermore, a thick alumina insulating layer 22 may be remained and may be utilized as a part of a member for defining the recessed portion 25.

Next, in order to form one of poles, a mask made of a photoresist is formed on the surface of the first magnetic layer 24 in accordance with a predetermined pattern as shown in FIG. 15, and the first magnetic layer 24 is selectively etched. During this etching process, the first magnetic layer 24 formed on the island-like insulating layer 22 is removed.

Although in this embodiment, the one of shields is formed by etching the first magnetic layer 24 used as the mask for forming the recessed portion 25 into a desired pattern, the mask for forming the recessed portion may be made of a metal or metal compound and the first magnetic layer may be formed in accordance with a predetermined pattern after removing the mask.

Subsequently as shown in FIG. 16, an insulating layer 26 made of alumina is formed, with a thickness of 0.3–0.5 μm, on the inner surface of the recessed portion 25 and on the first magnetic layer 24, then a second magnetic layer 27 constituting a part of one of poles and having a thickness of about 4 μm is formed in accordance with a given pattern on the insulating layer 26, and thereafter an insulating layer 28 made of alumina is formed with a thickness of 0.5–1 μm on said second magnetic layer.

FIG. 17 is a plane view showing the second magnetic layer 27 formed in accordance with the predetermined pattern as mentioned above. In FIG. 17, the insulating layer 28 formed on the second magnetic layer 27 is omitted and a thin film coil and a pair of poles for an inductive type thin film magnetic head to be formed later are denoted by imaginary lines.

As explained above, the recessed portion 25 is formed in the surface of the substrate 21 such that the apex angle is defined by the side wall of the recessed portion, and therefore the apex angle is not changed by the heating treatment of 250° C. during the formation of the thin film coil. The inclination angle of the side wall of the recessed portion 25 can be formed at will by suitably selecting the usually used etching conditions, materials of the mask and buffer layer, but according to the invention, the inclination angle may be preferably set to 45°–75°, particularly 55°–65°. In the present embodiment, said inclination angle is set to 60°.

Moreover, a photoresist layer or SOG (Spin On Glass) layer may be formed on the above mentioned element separating alumina insulating layer 26 to obtain a recessed portion 25 having a smooth surface by embedding the sharp protrusions and depressions within the photoresist layer or SOG layer.

Then, as depicted in FIG. 19, a first magnetic layer 27 constituting one of poles of the thin film magnetic head is formed with a thickness of 3–4 μm. In the present embodiment, this first magnetic layer 27 is made of a permalloy (Ni:80 wt %, Fe:20 wt %), but it may be made of a magnetic material having a high cohesive force such as iron nitride or amorphous magnetic material such as Fe-Co-Zr. Furthermore, in the present embodiment, the first magnetic layer having a given pattern is formed by the plating which uses a pattern layer obtained by the photoresist technique, but according to the invention, after forming a permalloy layer by the sputtering, the first magnetic layer may be formed by the dry etching such as the ion milling using a photoresist pattern and an alumina mask.

Further, as shown in FIG. 20, a thin film coil 29 is formed within the recessed portion 25 such that the thin film coil is electrically insulated by an insulating layer 28. In the present embodiment, this insulating layer 29 is made of a photoresist, but may be made of SOG layer which has been generally used in the flattening process in the semiconductor device manufacturing method or a silicon oxide or silicon nitride formed by the plasma CVD. In any case, in order to flatten the surface of the insulating layer 28, the heating treatment at about 250° C. is conducted, but in the present embodiment, a configuration of the recessed portion 25 is not changed by such a heating treatment.

Next, as shown in FIG. 21, an alumina insulating layer 30 is formed on an exposed surface of the first magnetic layer 27 as well as on a surface of the insulating layer 28 with a thickness of 4–5 μm. The insulating layer 30 may be made of silicon oxide or silicon nitride instead of alumina. Next, the alumina insulating layer 30 is flattened by the chemical mechanical polishing (CMP) as depicted in FIG. 22. This polishing treatment is carried out until the surface of the first magnetic layer 27 is exposed.

Then, as illustrated in FIG. 23, on a gap layer 31, a second magnetic layer 32 (referred to pole chip) is selectively formed in accordance with a given pattern with a thickness of about 1–4 μm, said second magnetic layer defining a width W of record tracks. The second magnetic layer 32 is made of a permalloy (Ni:50 wt %, Fe:50 wt %). After that, a portion of the gap layer 31 near the pole chip 32 is selectively removed by performing the reactive ion etching or ion beam etching, while the pole chip is used as a mask. Then, the exposed first magnetic layer 27 is etching over a depth of 100–200 nm by, for instance the ion milling to form a trim structure as shown in FIG. 24.

It should be noted that in the specification, the pole portion means a region extending from the edge of the recessed portion 25 to the end surface of the stacked body, over which the first magnetic layer 27, gap layer 31 and second magnetic layer (pole chip) 32 are contacted with each other. Therefore, in a final process, when the end surface is polished to form the air bearing surface, the pole portion is constructed by a region extending from the edge of the recessed portion 25 to the air bearing surface, and this distance corresponds to the throat height TH.

In the present embodiment, it is important that the second magnetic layer 32 is formed not only over the pole portion, but also over a rear region beyond the pole portion. In the known thin film magnetic head, the pole chip and top pole are contacted with each other over a small area and they are brought into contact with each other at right angles, and therefore the magnetic flux is liable to be saturated at this contact area and a sufficiently satisfactory writing performance can not be attained. However, in the present embodiment, the pole chip and top pole are brought into contact with each other not only at the pole portion, but also at the rear portion beyond the pole portion, and therefore the above mentioned saturation of the magnetic flux can be effectively avoided. As a result of this, a sufficiently satisfactory writing performance can be obtained. It should be noted that if there can be obtained a sufficiently large contact area, the pole chip and top pole may be contacted with each other only at the rear portion beyond the pole portion.

According to the invention, there is no limitation in a shape of the rear portion of the pole chip 32 beyond the pole portion, and may be shaped to extend straightly as illustrated in FIG. 28 or may be shaped to widen toward the rear as depicted in FIG. 29 as long as the pole chip and third magnetic layer are brought into contact with each other at the rear region beyond the pole portion. Furthermore, in FIG. 29, the rear portion of the pole chip beyond the pole portion is widened at an expansion angle of about 90°, but the expansion angle is not limited to this value, but may be set any value within a range of 30–180°. A preferable angle range is 45–120°. It should be noted that in FIGS. 28 and 29, a third magnetic layer 34 to be formed later is denoted by an imaginary line.

After forming the second magnetic layer 32 in the manner explained above, an alumina insulating layer 33 having a thickness of 34 μm is formed, and then the second magnetic layer 32 is exposed by CMP and a third magnetic layer 34 made of a permalloy like as the first magnetic layer 27 is formed with a thickness of 3–4 μm as shown in FIG. 25. As explained above with reference to FIGS. 27 and 28, the third magnetic layer 34 has a plan configuration which is substantially equal to a regular pentagon with a pole portion. In this manner, the third magnetic layer 34 is formed such that it expands toward the backward and covers the second magnetic layer 32. Therefore, although an alignment of the third magnetic layer with respect to the pole chip deviates slightly, the contact area as a whole is not changed, and the saturation of the magnetic flux can be avoided.

It should be noted that the third magnetic layer 34 is brought into contact with the first magnetic layer 27 via the second magnetic layer 32 at a rear portion remote from the pole portion, and therefore the thin film coil 29 passes through a closed magnetic path formed by the first, second and third magnetic layers.

Next, as illustrated in FIG. 26, a MR layer 36 for constituting the MR element is formed on the third magnetic layer 34 such that the MR layer is embedded within a non-magnetic and electrically insulating shield gap layer 35, and then a magnetic shield layer 37 for the MR element is formed with a thickness of 3–4 μm and an overcoat layer 38 made of alumina is formed for protecting the MR element.

Finally, as shown in FIG. 28, the side surface at which the gap layer 31 and MR layer 36 are formed is polished to form the air bearing surface 39 which is to be opposed to a magnetic record medium and an MR element 40 having a desired MR height. In the present embodiment, the edge of the recessed portion 25 formed in the substrate 21 is used as the positional reference for the air bearing surface 39. Since a position of this edge is not varied during the manufacturing process, it is possible to define the throat height TH, MR height MRH and apex angle θ which are accurately correspond to desired design values.

The above mentioned second magnetic layer 32, i.e. pole chip may be made of a material having a high saturation magnetic flux density such as iron nitride (FeN), Fe-Cr-Zr series amorphous alloy and Fe-C series amorphous alloy in addition to the above stated permalloy (Ni:50 wt %, Fe:50 wt %). Moreover, more than one of these materials may be used by stacking.

Moreover, the first and second magnetic layers 27 and 34 may be made of any kinds of known materials having a high saturation flux density in addition to the above mentioned permalloy (Ni:80 wt %, Fe:20 wt %).

Further, the gap layer 31 may be made of an oxide such as $Al_2O_3$ and $SiO_2$, a nitride such as AlN, BN and SiN or an electrically conductive non-magnetic material such as Au, Cu and NiP.

Figures 30A, 30B:
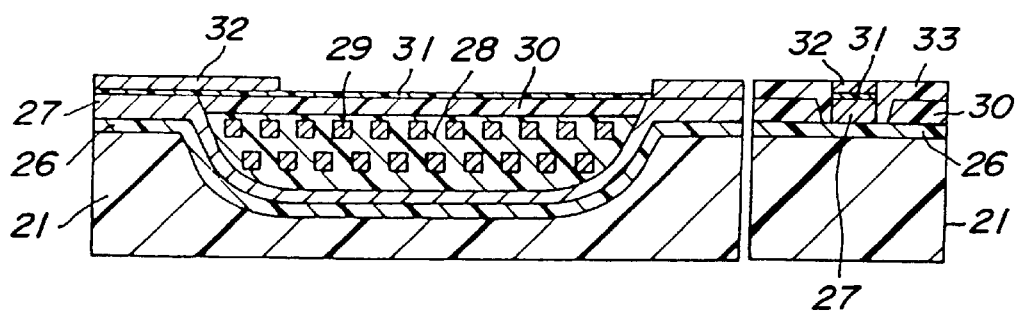
FIGS. 30A and 30B are cross sectional views showing the trim structure of the first magnetic layer of another embodiment of the thin film magnetic head according to the invention.

FIG. 30 shows another embodiment of the combination type thin film magnetic head manufactured by the method according to the invention. In the above explained embodiment, as shown in FIG. 24, upon forming the trim structure by etching the gap layer 31 and first magnetic layer 27 while the pole chip 32 of the pole portion is used as a mask. In the present embodiment, the first magnetic layer 27 is etched over its whole thickness while the pole chip 32 is used as a mask. In case of etching the first magnetic layer 27 over a part of its thickness in the previous embodiment, the magnetic flux might leak at the edge at which the first magnetic layer does not overlap with the pole chip 32, and thus a track width might be widened due to the writing by the leaked magnetic flux. However, in the present embodiment, since the etching is performed over a whole thickness of the first magnetic layer 27, there is not formed such an edge at which the first magnetic layer does not overlap with the pole chip 32, and the above undesired widening of the effective track width can be avoided.

FIGS. 31 and 32 show an embodiment in which the element separating insulating layer 26 is formed to have a thickness $t_1$, and FIGS. 33 and 34 illustrate another embodiment in which the element isolating insulating layer 26 has a thickness of $t_2$ which is larger than the thickness $t_1$. When the element isolating insulating layer 26 have different thicknesses, a distance $d_1$ from the edge of the recessed portion 25 formed in the substrate 21 to an edge of the MR reproducing element 40 opposite to an edge which exposes on the air bearing surface 39 is identical in both embodiments, but a distance from the edge of the recessed portion to the rear edge of the pole portion of the first magnetic layer 27 becomes $d_2$ in the embodiment shown in FIGS. 31 and 32 and becomes $d_3$ in the embodiment depicted in FIGS. 33 and 34, $d_3$ being longer than $d_2$. In this manner, the distance $d_2$, $d_3$ from the edge of the recessed portion 25 to the rear edge of the first magnetic layer 27 can be controlled, while the distance $d_1$ from the edge of the recessed portion to the rear edge of the MR reproducing element 40 is remained unchanged.

In this manner, according to the invention, the balance between the throat height TH and the MR height MRH can be adjusted by controlling a thickness of the element isolating insulating layer 26, and therefore a manufacturing yield of the combination type thin film magnetic head can be improved. Furthermore, during the manufacturing process, it is very easy to control a thickness of the element isolating insulating layer 26, and thus various requests of users can be responded easily and promptly.

FIGS. 35–49 show successive steps of a second embodiment of the method of manufacturing the combination type thin film magnetic head according to the invention. Also in these drawings, A denotes a cross sectional view cut along a line perpendicular to the air bearing surface, and B represents a cross sectional view of the pole portion cut along a line parallel with the air bearing surface.

At first, as shown in FIG. 35, an insulating layer 122 made of alumina and having a thickness of about 10 $\mu$m is formed on one surface of a substrate main body 121 made of AlTiC. In the present specification, a combination of these substrate main body 121 and insulating layer 122 is called a substrate or wager 123. Further, in this specification, an insulating layer means a film having at least an electrically insulation property and may have or may not have a non-magnetic property. In general, a material such as alumina having both the electrically insulating property and non-magnetic property is used, and therefore the insulating layer and the non-magnetic layer are sometimes used to have the same meaning.

Next, as shown in FIG. 36, a first magnetic layer 124 is formed on the insulating layer 122 of the substrate 123 such that the first magnetic layer includes an opening at a portion at which a recessed portion is to be formed later, said first magnetic layer constituting one of the shields for the magnetoresistive type thin film magnetic head. Then, the reactive ion etching is performed using the first magnetic layer 124 as a mask to form a recessed portion 125 in the surface of the insulating layer 122 as shown in FIG. 36. In this figure, a periphery of the opening of the first magnetic layer 124 defining the recessed portion 125 is denoted as a reference numeral 124a. As illustrated in FIG. 36, at a central portion of the recessed portion 125 there is remained a part of the insulating layer 122 like as an island and the magnetic layer is formed on its top surface. This structure is required for coupling the other pole to be formed later with the one pole.

In the present embodiment, the first magnetic layer 124 is made of a permalloy and is formed by the plating. The reactive ion etching can be conducted using the gas such as $BCl_3$, $Cl_2$, $CF_4$, $SF_6$. By such a reactive ion etching, it is possible to form the recessed portion 125 having a large depth of not less than 5 $\mu$m in an accurate manner. In the present embodiment, the recessed portion 125 has a depth of 7–8 $\mu$m.

In the present embodiment, the apex angle θ is determined by an inclination angle of the side wall of said recessed portion 25, and the side wall of the recessed portion has the inclination angle of 45–70°, particularly 55–65°. In the present embodiment, the inclination angle is set to about 60°.

In order to form one of the poles, a mask made of a photoresist is formed on the first magnetic layer 124 in accordance with a given pattern, and then the first magnetic layer is selectively etched as depicted in FIG. 37. During this etching process, the first magnetic layer 124 formed on the island-shaped insulating layer 122 is removed.

In the present embodiment, one of the shields is formed by etching the first magnetic layer 124 which has been used as the mask for forming the recessed portion 125 after the formation of the recessed portion 125. According to the invention, a mask for forming the recessed portion may be made of metal or metal compound, and the first magnetic layer may be formed in accordance with a given pattern after removing the mask.

Next, as shown in FIG. 38, an alumina insulating layer 126 having a thickness of 0.2–0.8 $\mu$m is formed on the inner surface of the recessed portion 125 as well as on the first magnetic layer 124 in accordance with a given pattern, a second magnetic layer 127 constituting the other pole is formed thereon with a thickness of about 4 $\mu$m in accordance with a given pattern, and then an alumina insulating layer 128 having a thickness of 0.5–1 $\mu$m is formed thereon. As explained above, according to the present invention, by controlling a thickness of the insulating layer 128 within a range of 0.2–0.8 $\mu$m, the throat height can be controlled without changing the MR height.

Figure 39:
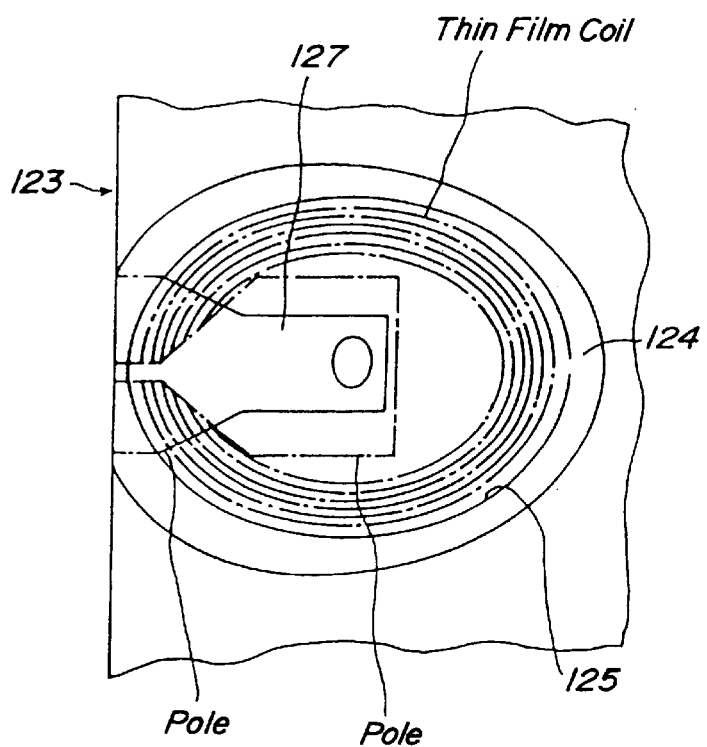
FIG. 39 is a plan view illustrating the combination type thin film magnetic head in the step of FIG. 38.

FIG. 37 is a plan view showing the condition after the second magnetic layer 127 is formed in accordance with a given pattern. In FIG. 39, the insulating layer 128 formed on the second magnetic layer 127 is dispensed with and the thin film coil and poles of the inductive type thin film magnetic head to be formed later are denoted by imaginary lines.

In the actual manufacturing process, after forming a number of combination type thin film magnetic heads in a matrix on the wafer, the wafer is divided into bars, a side edge of respective bars is polished to form the air bearing surfaces, and finally the bar is divided into a plurality of the combination type thin film magnetic heads. However, in the drawings, only a single thin film magnetic head is shown.

Figure 40A:
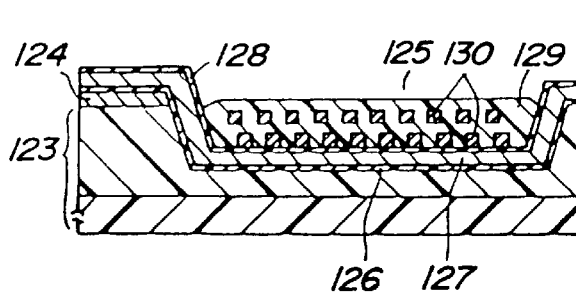
Figure 40B:
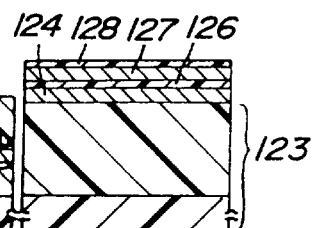

Subsequently as shown in FIG. 40, a two layer thin film coil 130 is formed within the recessed portion 25 such that the thin film coil is electrically insulated by an insulating layer 129, within said recessed portion having been formed the insulating layer 126 having a controlled thickness, second magnetic layer 127 and insulating layer 128. During the formation of this thin film coil 130, the annealing process is carried out at a temperature of 200–250° C. to flatten the surface.

Next, as shown in FIG. 41, an alumina insulating layer 131 is formed on a whole surface with a thickness of 3–4 $\mu$m. This insulating layer 130 may be made of silicon oxide instead of alumina.

Then, the alumina insulating layer 131 is flattened by the chemical mechanical polishing (CMP) such that the surface of the first magnetic layer 124 is exposed, and the surface of the first insulating layer 124 is brought into co-planer with the surface of the first magnetic layer as depicted in FIG. 42. By performing such a process, a thickness of the first magnetic layer 124 which are about 4 $\mu$m in an original condition is reduced to about 3 $\mu$m. Furthermore, in this condition, the edge of the second magnetic layer 127 is exposed.

In the present embodiment, the assembly shown in FIG. 42 is called a common unit for thin film magnetic head which can be commonly used for manufacturing combination type thin film magnetic heads having various properties. A number of common units for thin film magnetic heads are previously manufactured and stocked, and a combination type thin film magnetic head having a property required by a user can be manufactured while the common unit is utilized as a starting material. In this manner, according to the invention, various requests of users can be suitably and promptly satisfied by the above feature together with the above mentioned feature that the throat height can be controlled easily without loosing a balance between the throat height and the MR height.

Next, as illustrated in FIG. 43, a shield gap layer 133 having a MR layer 132 embedded therein is formed on the first magnetic layer 124. This can be performed be performed in the following manner. After forming an alumina layer having thickness of about 0.1 µm, the MR layer 132 constituting the AMR element or GMR element in accordance with a given pattern, a lead pattern (not shown) for the MR layer is formed, and finally an alumina layer is formed with a thickness of 0.1 µm. For the sake of clarity, in FIG. 43, these alumina layers are shown as a single united shield gap layer 133. Furthermore, the MR layer 132 is formed on the first magnetic layer 124 only at a region at which the pole portion will be formed later, but the shield gap layer 133 is formed on a whole surface.

Next, parts of the shield gap layer 126 formed on the edge and the island-like portion of the second magnetic layer 127 are selectively removed. This process may be conducted by the lift-off process, but in the present embodiment, the process is carried out by selectively removing the alumina of the shield gap layer 133 by means of the reactive ion etching with $BCl_2$ series gas, while the photolithography is utilized.

Then, as shown in FIG. 44, a third magnetic layer 134 is formed such that the third magnetic layer is coupled with the second magnetic layer 127 at the edge of the recessed portion 125. In the present embodiment, the third magnetic layer 134 is formed by depositing a permalloy by the plating with a thickness of about 3.5 µm. Then, an alumina insulating layer 135 is formed on a whole surface with a thickness of several microns, and is flattened by CMP to expose the third magnetic layer 134 as depicted in FIG. 45. Also in this process, the over-etching is conducted such that a part of the third magnetic layer 134 is exposed, and therefore a thickness of the third magnetic layer is reduced to about 3 µm and the third magnetic layer formed on the island-like portion is also exposed.

After that, a write gap layer 136 made of alumina is formed on a whole surface with a thickness of 150–200 nm, a part of the write gap layer situating on the island-like portion is selectively removed, and then a fourth magnetic layer 137 constituting the other pole is formed in accordance with a given pattern with a thickness of about 3 µm as illustrated in FIG. 46. This fourth magnetic layer 1367 has a narrow pole portion. Further, the fourth magnetic layer 137 is brought into contact with the third magnetic layer 134 formed on the above mentioned island-like portion, and said third magnetic layer is coupled with the second magnetic layer. In this manner, there is formed a closed magnetic circuit which surrounds a part of the thin film coil 130.

Next, the reactive ion etching is performed using the pole portion of the fourth magnetic layer 137 as a mask, and a portion of the write gap layer 136 in a vicinity of the pole portion is selectively removed as depicted in FIGS. 47 and 48. By removing the write gap layer 136 by the reactive ion etching, the etching can be done within a short time period, and thus a reduction in a thickness of the fourth magnetic layer 137 is small. For the sake of simplicity, in FIG. 48, the thin film coil 130 and third magnetic layer 134 underneath the write gap layer 136 are denoted by solid lines.

Next, the surface of the third magnetic layer 134 is partially removed by the ion beam etching, in the present embodiment by the ion milling while the pole portion of the write gap layer 136 is used as a mask to form the trim structure as shown in FIG. 49. By forming the trim structure in the surface of the third magnetic layer 134 using the pole portion of the fourth magnetic layer 137 and write gap layer 136, the trim structure can be always aligned with respect to the other pole constituted by the fourth magnetic layer, and thus the leakage of the magnetic flux can be effectively suppressed.

Moreover, when the ion beam etching is used for etching the third magnetic layer 134 and the etching angle is suitably selected, a side configuration of the trim structure can be improved.

Furthermore, a protecting overcoat layer 139 made of alumina is formed on a whole surface with a thickness of 3–5 µm, and then the etching is carried out to expose contact pads connected to the thin film coil 130 of the inductive type thin film magnetic head and contacts pads connected to the MR layer 132 of the magnetoresistive type thin film magnetic head. In the present embodiment, since the fourth magnetic layer 137 has a flat surface and the overcoat layer 139 can be thin, the above etching such as ion milling and reactive ion etching for exposing the contact pads can be easily performed within a short time period. In the conventional combination type thin film magnetic head, it is necessary to provide the thick overcoat layer, the etching for exposing the contact pads requires a long time period. Therefore, the through-put is decreased.

After the respective components of the combination type thin film magnetic head have been formed on the wafer 123, the wager is divided into a plurality of bars, in each of which a number of combination type thin film magnetic heads are aligned. Then a side edge of a bar is polished to form the air bearing surface, and finally the bar is divided into respective combination type thin film magnetic heads. During the polishing process for the air bearing surface, the position of the edge of the recessed portion 125 is used as a positional reference, and since this position is not deviated during the manufacturing process, it is possible to obtain the MR reproducing element having a desired MR height corresponding to a design value.

As shown in FIGS. 49 and 50, also in the present embodiment, by changing a thickness of the element isolating insulating layer 126, the throat height can be controlled without changing the MR height. It should be noted that in the embodiment shown in FIG. 50. a thickness of the element isolating insulating layer 126 is larger than that of the embodiment illustrated in FIG. 49, and thus the throat height in FIG. 50 is longer than that in FIG. 49. However, the MR height is identical in both embodiments. It should be noted that FIGS. 49 and 50 depict the condition prior to the polishing for the air bearing surface, and thus actual throat height and MR height become smaller, but the above explained relation is not changed at all.

In FIG. 49, a thickness of the element isolating insulating layer 126 is denoted by $t_1$ and a thickness of this layer is represented by $t_2$ which is larger than $t_1$. By changing a thickness of the element isolating insulating layer 126 in this manner, although a distance $d_1$ from the edge of the recessed portion 125 formed in the substrate 123 to the edge of the MR layer 132 opposite to the air bearing surface, a distance from the edge of the recessed portion to the rear edge of the pole portion of the second magnetic layer 127 becomes $d_2$ in FIG. 49 and becomes $d_3$ which is longer than $d_2$ in FIG. 50. That is to say, also in this embodiment, a distance $d_2$, $d_3$ from the edge of the recessed portion 125 to the rear edge of the second magnetic layer 127 can be controlled, while a distance $d_1$ from the edge of the recessed portion to the rear edge of the MR reproducing element 132 is remained constant.

In the present invention, since the balance between the throat height TH and the MR height can be adjusted by controlling a thickness of the element isolating insulating layer 126, the yield of manufacturing the combination type thin film magnetic head can be improved. Further, during the manufacturing process, a thickness of the element isolating insulating layer 126 can be controlled simply, various requirements of users can be satisfied in an easy and prompt manner.

In the present embodiment, during the polishing for obtaining the air bearing surface, the edge of the recessed portion 125 is used as a positional reference, and since this position is not changed during the manufacturing process, the throat height TH and MR height MRH can be formed to have desired design values. Moreover, the apex angle θ is determined by the inclination angle of the side wall of the recessed portion 125 and this inclination angle can be accurately set to a desired angle and is not changed during the manufacturing process. Therefore, it is possible to obtain the combination type thin film magnetic head having a desired apex angle θ. In this manner, in the combination type thin film magnetic head according to the invention, a sufficient miniaturization can be attained without degrading the performance.

Furthermore, although the combination type thin film magnetic head is of the normal type in which the inductive type thin film writing magnetic head is stacked on the MR reproducing element, since the MR element 132 is formed after the heating treatment at about 250° C. for forming the thin film coil 130, the MR layer is not affected by the heating treatment and a GMR layer having a higher sensitivity but being liable to be influenced by heat may be advantageously used.

FIGS. 51–58 show a third embodiment of the method of manufacturing the combination type thin film magnetic head according to the invention. Also in these drawings, A denotes a cross sectional view cut along a line perpendicular to the air bearing surface and B shows a cross sectional view of the pole portion cut along a line parallel with the air bearing surface. In the present embodiment, the combination type thin film magnetic head having the normal configuration, in which the MR reproducing element is formed on the substrate and the inductive type thin film writing magnetic head is stacked on the MR element.

At first, as shown in FIG. 51, a substrate 223 is prepared by forming an alumina insulating layer 222 on a substrate main body 221 made of AlTiC, and then a first magnetic layer 224 is formed thereon in accordance with a given pattern. Next, as illustrated in FIG. 52, the reactive ion etching is performed using the first magnetic layer as a mask to form a recessed portion 225. An island-like portion is remained at a center of the recessed portion 225.

Figure 54A:
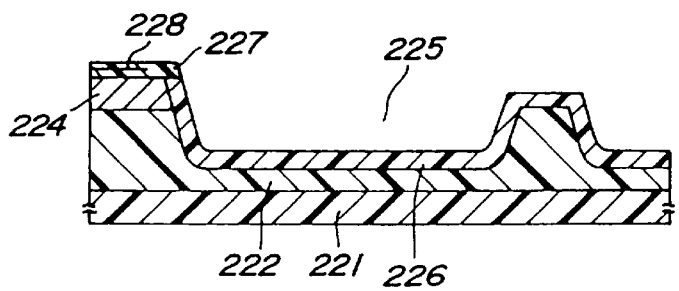
Figure 54B:
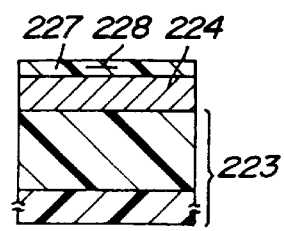

Next, as depicted in FIG. 53, after selectively removing the first magnetic layer 224 on the island-like portion within the recessed portion 225, a first insulating layer 226 having a controlled thickness is formed on an inner surface of the recessed portion 225. Further, as shown in FIG. 54, a MR layer 228 is formed on the first insulating layer 224 in accordance with a given pattern such that the MR layer is embedded within a shield gap layer 227.

Figure 55A:
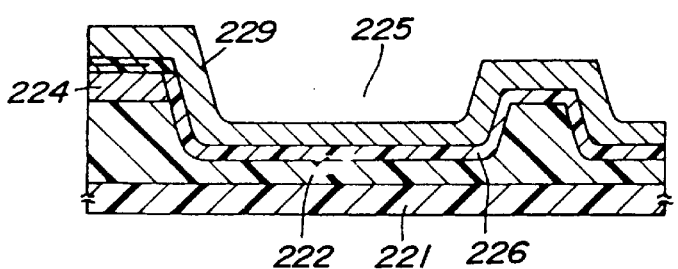
Figure 55B:
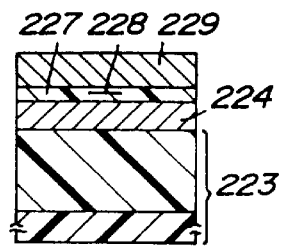
Figure 56A:
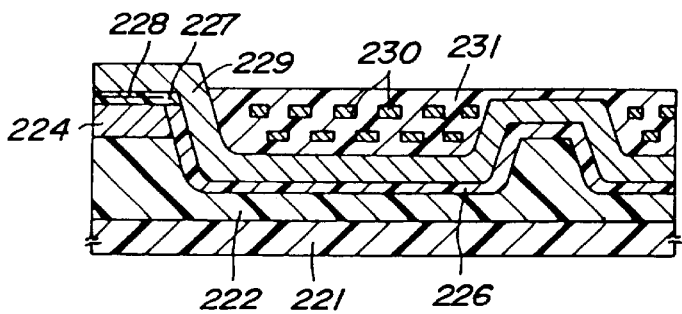
Figure 56B:
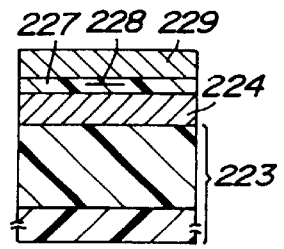
Figure 57A:
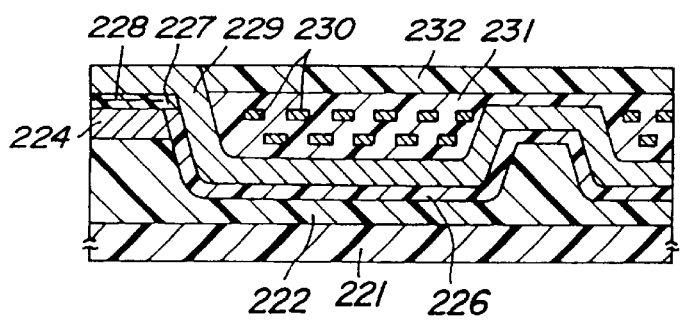
Figure 57B:
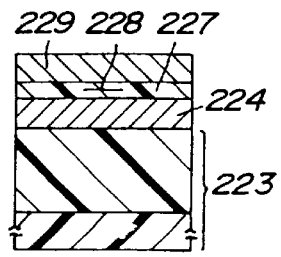

Next, as shown in FIG. 55, a second magnetic layer 229 is formed on the first insulating layer 226 within the recessed portion 225 as well as on the shield gap layer 227. Then, as shown in FIG. 56, a thin film coil 230 is formed within the recessed portion 225 such that the thin film coil is supported by a second insulating layer 231 in an electrically isolated manner. Next, as depicted in FIG. 57, after forming a third insulating layer 232 on the second magnetic layer 229 and second insulating layer 231, the etch-back is carried out to expose the surface of the second magnetic layer 229 and to form a flat surface.

Figure 58A:
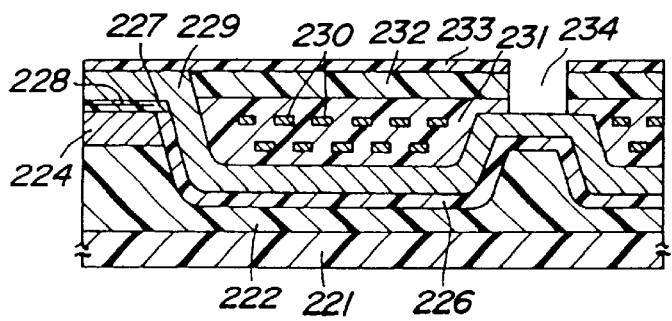
Figure 58B:
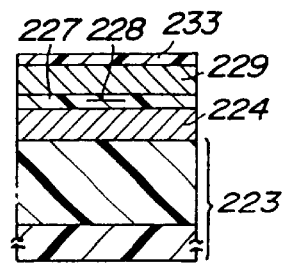

Next, as shown in FIG. 58, a gap layer 233 is formed. An opening 234 is formed in a rear portion of this gap layer 233 through the second and third insulating layers 231 and 232 to exposed the surface of the second magnetic layer 229.

Figure 59A:
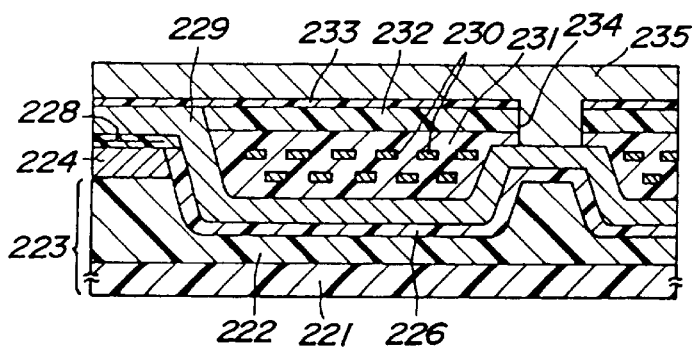
Figure 59B:
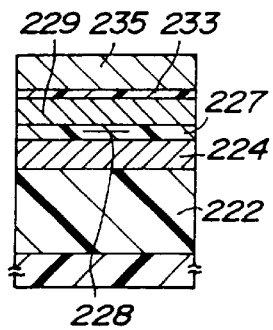

Then, as depicted in FIG. 59, a third magnetic layer 235 is formed on the gap layer 233. This third magnetic layer 235 is coupled with said second magnetic layer 229 through said opening 234.

Following steps are identical with those of the above explained embodiment, and their detailed explanation is dispensed with. Also in the present embodiment, by controlling a thickness of the first insulating layer 226 formed on the inner wall of the recessed portion 225, the reference position of throat height zero can be changed, and therefore the throat height can be controlled. However, the MR height MRH is not changed even if a thickness of the first insulating layer 226 is changed. In this manner, the throat height TH can be controlled in a simple and accurate manner without breaking a balance between the throat height TH and the MR height MRh.

The present invention is not limited to the above embodiments and many alternations and modifications may be conceived within the scope of the invention. For example, in the above embodiments, the MR reproducing element is constructed by the AMR element, but according to the invention, the MR reproducing element may be formed by the GMR element using spin bulb layer, super-lattice GMR layer and granular GMR layer. These GMR elements have a drawback that the reproduced output is deceased to a large extent by the high temperature annealing at about 250C for forming the thin film coil of the thin film magnetic head. For instance, in the spin bulb film having Ni—Fe magnetic and Cu non-magnetic layers, a multi-layer structure of the spin bulb film might be destroyed by heating at a temperature not lower than 250° C. due to a mixing of Ni and Cu. In the above mentioned first and second embodiments according to the invention, the formation of the thin film coil within the recessed portion has been completed before forming the GMR film, and thus the GMR film is not affected any more.

Moreover, in the above mentioned first embodiment, the trim structure is formed in the first magnetic layer 27 by conducting the etching process using the pole chip 32 formed by the second magnetic layer as a mask, but such a trim structure is not always necessary.

Moreover, in the above embodiments, the thin film magnetic head is constructed as the combination type thin film magnetic head in which the recording thin film magnetic head and MR reproducing element are stacked, but according to the invention it is not always necessary to provide the MR reproducing element and only the inductive type thin film magnetic head may be formed.

As explained above, according to the thin film magnetic head, the first insulating layer and thin film coil are formed within the recessed portion formed in the surface of the substrate, the second magnetic layer constituting the pole chip is formed via the gap layer, and the third magnetic layer is formed to be contacted with the second magnetic layer. Therefore, the throat height TH and apex angle θ can be formed accurately to have desired design values and the performance of the thin film magnetic head can be improved. Furthermore, in the combination type thin film magnetic head having the reproducing head constructed by the magnetoresistive element, the formation of the thin film coil has been finished prior to the formation of the magnetoresistive element, and thus the magnetoresistive element is not affected by the heating treatment for forming the thin film coil, and the GMR element having a high sensitivity can be utilized, said GMR element being affected by the heating treatment.

According to the invention, when the trim structure is formed by etching the first magnetic layer using the pole chip constructed by the second magnetic layer as a mask, the magnetic flux is not expanded during the writing and thus the effective track width is not expanded. Therefore, the track width of sub-microns can be realized and the surface recording density can be materially improved. Further, the trim structure is formed by using the pole chip as a mask, the trim structure can be formed accurately by the self-alignment.

Furthermore, the second magnetic layer is extended inwardly beyond the pole portion, and thus a sufficiently large contact area can be attained between the second magnetic layer and the third magnetic layer, and the writing magnetic flux is not saturated at a point before the pole portion.

In the method of manufacturing the combination type thin film magnetic head according to the invention, by controlling a thickness of the insulating layer formed on the inner surface of the recessed portion formed in the substrate, the throat height zero reference position for the throat height of the inductive type thin film writing magnetic head can be controlled. In this case, the MR height of the MR reproducing element is not influenced at all, and therefore the throat height can be formed to have a desired design value without destroying the balanced condition between the throat height and the MR height.

Moreover, the control of a thickness of the insulating layer can be performed very easily without changing largely the manufacturing process, and therefore various requirements of users can be satisfied in an easy and prompt manner.

Furthermore, the apex angle of the inductive type thin film writing magnetic head is determined by the inclination angle of the side wall of the recessed portion and this inclination angle is not changed during the manufacturing process. Therefore, it is possible to manufacture the combination type thin film magnetic head having the apex angle corresponding to the desired design value.

What is claimed is:

1. A combination type thin film magnetic head including a magnetoresistive type reproducing head portion and an inductive type recording head portion, comprising:

a substrate having a recessed portion formed in a surface thereof;

a magnetic shield layer formed on a portion of the surface of the substrate disposed between the recessed portion and an air bearing surface;

a shield gap layer made of an non-magnetic and electrically insulating material and formed on the magnetic shield layer;

a magnetoresistive reproducing element embedded within the shield gap layer;

a first magnetic layer having a pole portion formed on the shield gap layer and an extended portion extending along a bottom wall of the recessed portion, said pole portion being exposed on the air bearing surface;

a thin film coil having a portion provided on the extended portion of the first magnetic layer to be embedded within the recessed portion such that coil windings of the thin film coil are isolated by an insulating layer;

a write gap layer made of a non-magnetic material and provided at least on the pole portion of the first magnetic layer; and a second magnetic layer having a pole portion which is opposed to the pole portion of the first magnetic layer via the write gap layer, a portion of the second magnetic layer remote from the pole portion thereof being magnetically coupled with a portion of the first magnetic layer remote from the pole portion of the first magnetic layer, said pole portion of the second magnetic layer being exposed on the air bearing surface;

wherein the portion of the thin film coil is fully embedded within the recessed portion such that the portion of the thin film coil is positioned closer to the substrate than the magnetoresistive reproducing element.

2. The combination type thin film magnetic head according to claim 1, wherein the insulating layer of the thin film coil is provided to constitute a flat surface together with the pole portion of the first magnetic layer, the write gap layer is provided on the flat surface to constitute a flat surface and the second magnetic layer is provided on the flat surface of the write gap layer to constitute a flat surface.

3. The combination type thin film magnetic head according to claim 1, wherein said recessed portion of the substrate is formed by etching using the magnetic shield layer as an etching mask.

4. The combination type thin film magnetic head according to claim 3, further comprising an insulating layer provided on the magnetic shield layer and the bottom wall of the recessed portion.

5. The combination type thin film magnetic head according to claim 1, wherein a side wall of the recessed portion has an inclination angle of 55–65°.

6. The combination type thin film magnetic head according to claim 1, wherein the recessed portion has depth not less than 5 μm.

7. The combination type thin film magnetic head according to claim 1, wherein the first magnetic layer is made of a magnetic material having a high saturation flux density.

* * * * *